United States Patent
Asai

(10) Patent No.: US 8,810,835 B2
(45) Date of Patent: Aug. 19, 2014

(54) DATA-PROCESSING APPARATUS THAT CAUSES DEVICE TO EXECUTE PROCESS

(75) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 495 days.

(21) Appl. No.: 13/161,691

(22) Filed: Jun. 16, 2011

(65) Prior Publication Data

US 2012/0013927 A1 Jan. 19, 2012

(30) Foreign Application Priority Data

Jul. 15, 2010 (JP) ................................ 2010-161016

(51) Int. Cl.
*G06F 3/12* (2006.01)
*G06K 15/00* (2006.01)

(52) U.S. Cl.
USPC .................. 358/1.15; 358/1.13; 358/1.16

(58) Field of Classification Search
None
See application file for complete search history.

(56) References Cited

U.S. PATENT DOCUMENTS

2002/0089688 A1* 7/2002 Ferlitsch et al. ............. 358/1.15
2002/0120742 A1* 8/2002 Cherry ........................ 709/226
2003/0002069 A1* 1/2003 Bhogal et al. ................ 358/1.15
2003/0011805 A1* 1/2003 Yacoub ........................ 358/1.15
2003/0086114 A1* 5/2003 Cherry et al. ................ 358/1.15
2005/0018236 A1 1/2005 Shirai et al.
2005/0174609 A1* 8/2005 Thurlow ...................... 358/425
2008/0204798 A1* 8/2008 Taniguchi et al. ........... 358/1.15

FOREIGN PATENT DOCUMENTS

| JP | H09-282118 A | 10/1997 |
| JP | 2001-134399 A | 5/2001 |
| JP | 2005-044080 | 2/2005 |
| JP | 2006-111799 | 4/2006 |
| JP | 2006-163990 A | 6/2006 |

OTHER PUBLICATIONS

JP Office Action mailed Mar. 19, 2013, JP Appln. 2010-161016, English translation.
JP Office Action mailed Jun. 19, 2012, JP Appln. 2010-161016, English translation.

* cited by examiner

*Primary Examiner* — Ming Hon
(74) *Attorney, Agent, or Firm* — Banner & Witcoff, Ltd.

(57) ABSTRACT

A data-processing method for being executed by a data-processing apparatus having a storage unit, includes: specifying a type of data or a function that corresponds to a process desired to be executed; reading, from the storage unit, device identification information that is stored in the storage unit in correspondence with the specified type of data or the specified function; and communicating with a device that is identified by the device identification information so as to cause the device to execute the desired process.

13 Claims, 18 Drawing Sheets

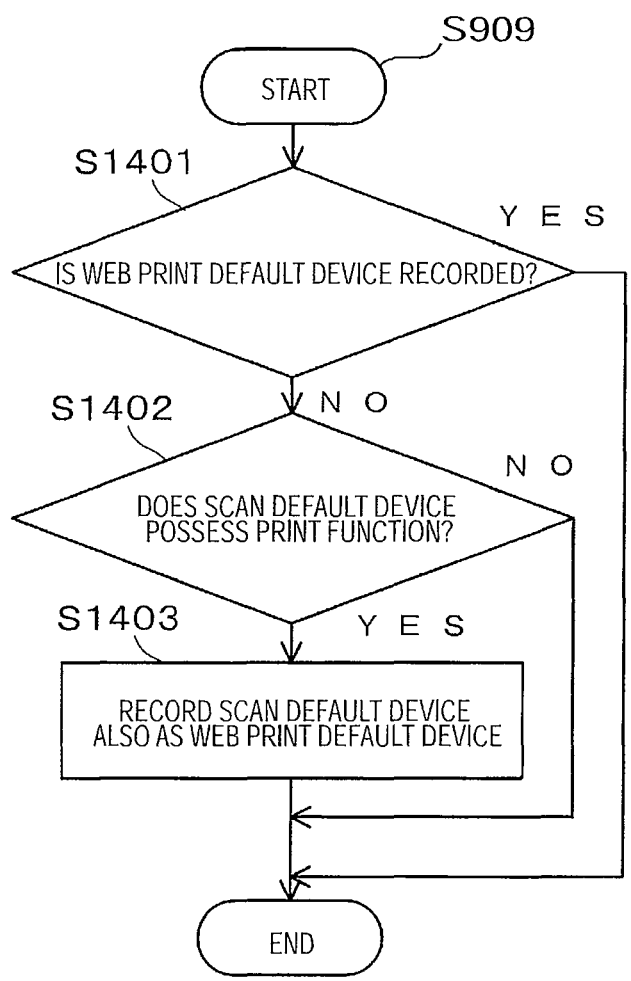

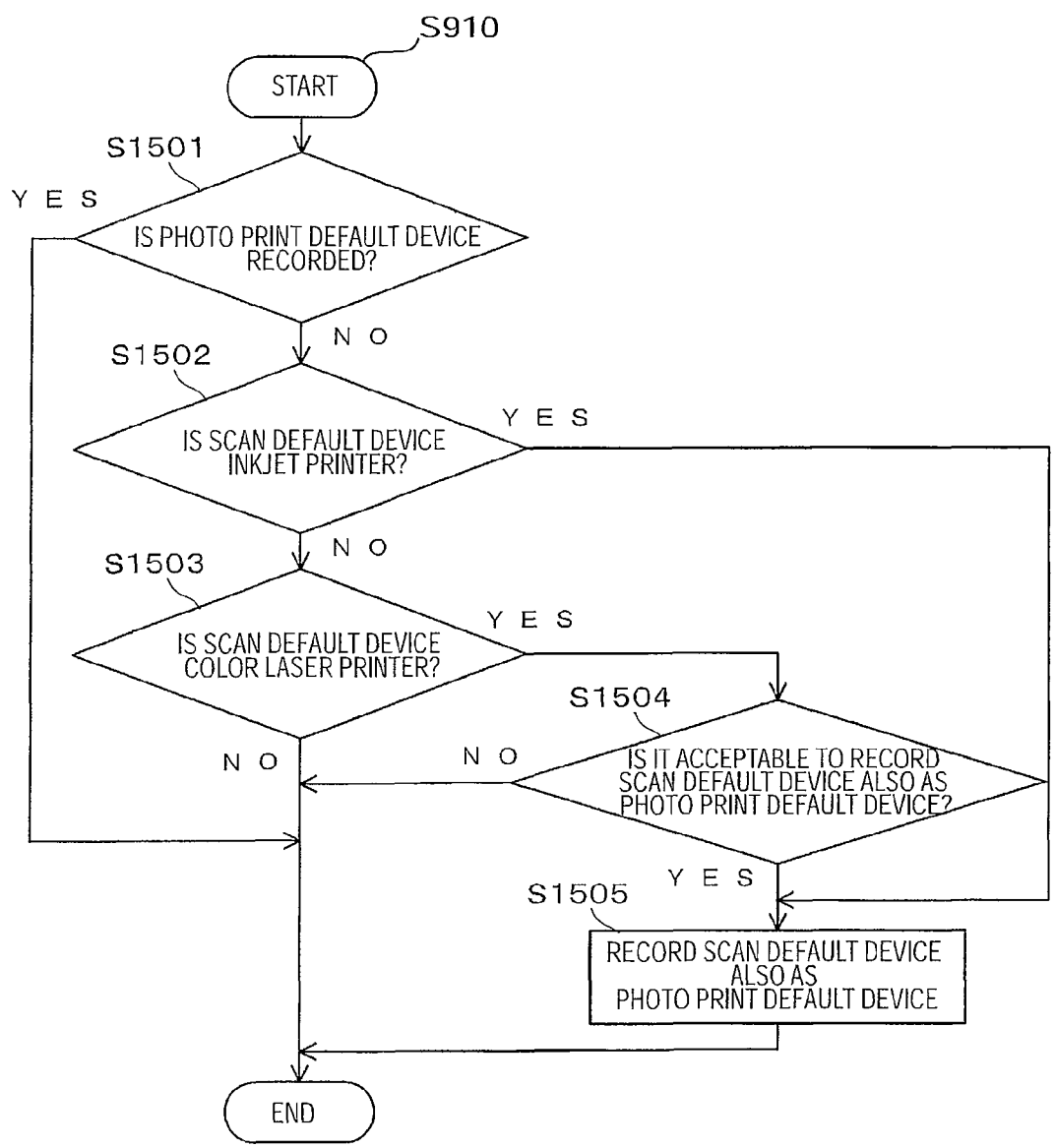

| IP ADDRESS | MODEL NUMBER | FUNCTION | | |
|---|---|---|---|---|
| | | PRINT FUNCTION | SCAN | COPY |
| 211.9.36.148 | Ink-MFP331 | INKJET COLOR | YES | YES |
| 211.9.36.132 | Scan432 | NO | YES | NO |
| 211.9.36.154 | Laser123 | LASER COLOR | NO | NO |

800

| http:// | URL |
|---|---|
| .bmp | LOCATION DATA FOR IMAGE DATA |
| .jpg | |
| .gif | |

TABLE 1

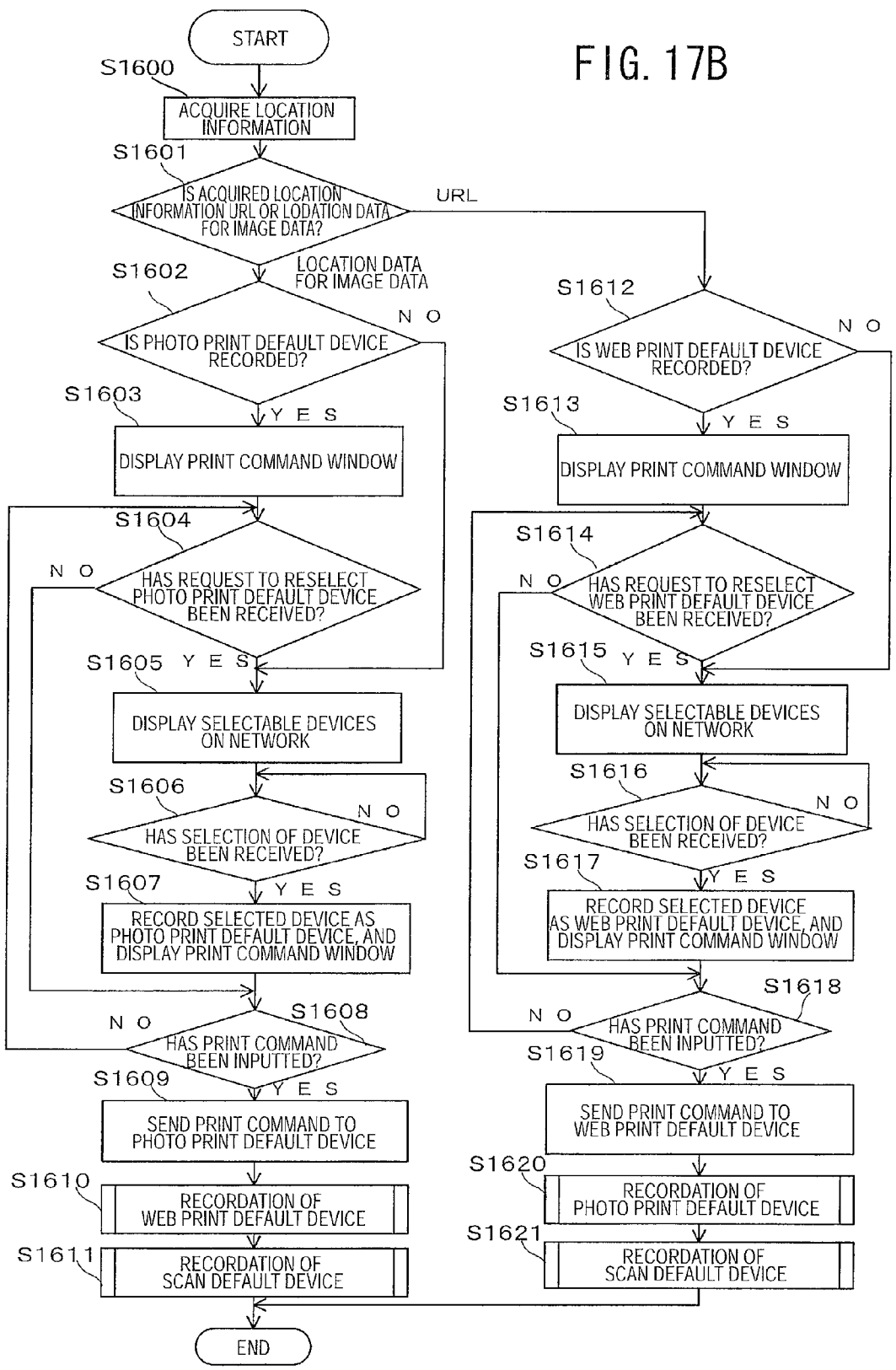

DATA-PROCESSING APPARATUS THAT CAUSES DEVICE TO EXECUTE PROCESS

CROSS REFERENCE TO RELATED APPLICATION

This application claims priority from Japanese Patent Application No. 2010-161016 filed Jul. 15, 2010. The entire content of this priority application is incorporated herein by reference.

TECHNICAL FIELD

The present invention relates to a data processor capable of designating devices to execute processes based on specific functions or types of data.

BACKGROUND

In recent years there has prevailed a printing environment in which the user of a personal computer or the like selects a desired one of a plurality of printers connected in a network environment and issues a print command. In order to print using a desired printer, the user installs a driver that supports the printer type. When the user installs this driver, the IP address of the printer that will be used through the driver is stored on the PC. The printer used most frequently by the user can also be registered in the PC as the default printer. Normally the user performs an operation on the PC to issue a print command to the printer registered as the default printer.

SUMMARY

However, since only one printer is set as the default printer, the user has to select a printer each time a printing operation is performed that is best-suited for the printing function.

In view of the foregoing, it is an object of the present invention to provide a data-processing apparatus and a data-processing method that can allow a user to easily instruct a suitable device to perform the user's desired process.

In order to attain the above and other objects, the invention provides a data-processing method for being executed by a data-processing apparatus having a storage unit, the method including: specifying a type of data or a function that corresponds to a process desired to be executed; reading, from the storage unit, device identification information that is stored in the storage unit in correspondence with the specified type of data or the specified function; and communicating with a device that is identified by the device identification information so as to cause the device to execute the desired process.

According to another aspect, the present invention provides a data-processing apparatus, including: a storage unit; a specifying unit; a reading unit; and a communicating unit. The storage unit is configured to store information. The specifying unit specifies a type of data or a function that corresponds to a process desired to be executed. The reading unit reads, from the storage unit, device identification information that is stored in the storage unit in correspondence with the specified type of data or the specified function. The communicating unit communicates with a device that is identified by the device identification information so as to cause the device to execute the desired process.

According to still another aspect, the present invention provides a storage medium storing a set of program instructions executable on a data-processing apparatus having a storage unit, the instructions including: specifying a type of data or a function that corresponds to a process desired to be executed; reading, from the storage unit, device identification information that is stored in the storage unit in correspondence with the specified type of data or the specified function; and communicating with a device that is identified by the device identification information so as to cause the device to execute the desired process.

BRIEF DESCRIPTION OF THE DRAWINGS

The particular features and advantages of the invention as well as other objects will become apparent from the following description taken in connection with the accompanying drawings, in which:

FIG. 14 is a flowchart showing a process executed in the process of FIG. 13 to store identification data for a Web print default device;

FIG. 15 is a flowchart showing a process executed in the process of FIG. 13 to store identification data for a photo print default device;

FIG. 17B is a flowchart showing a process performed by the CPU in the data processor according to a print-and-scan application program of the second embodiment.

DETAILED DESCRIPTION

Figure 1:
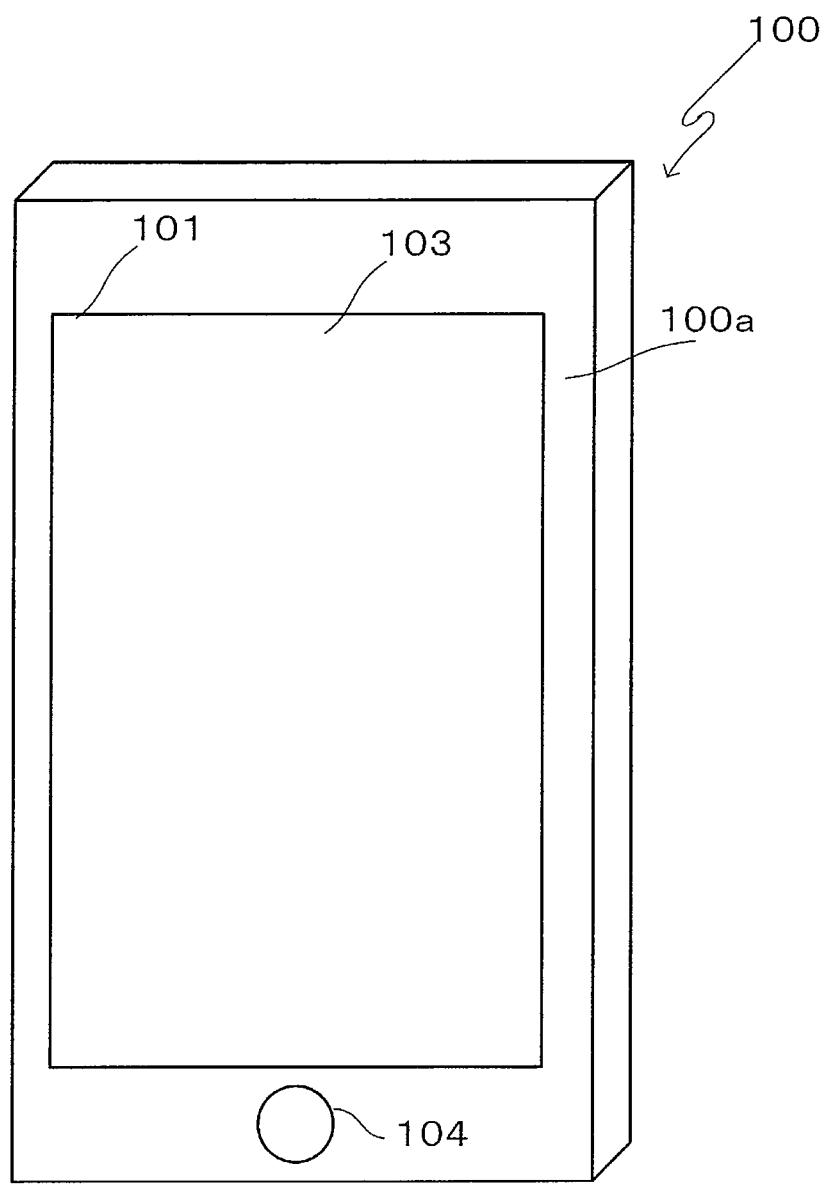
FIG. 1 is an external view of a data processor according to a first embodiment of the present invention.

A data-processing apparatus and a data-processing method according to embodiments of the invention will be described while referring to the accompanying drawings wherein like parts and components are designated by the same reference numerals to avoid duplicating description.

<First Embodiment>

FIG. 1 shows a portable data processor 100, such as a mobile phone or a portable terminal device, according to a first embodiment of the present invention. The data processor 100 has a relatively thin, or flattened, box-shaped case. One side surface of the case constitutes an operating surface 100a. The center region of the operating surface 100a constitutes a display area 101. The data processor 100 is provided with a touch panel 103 disposed in the display area 101, and an input interface 104 disposed on the operating surface 100a below the display area 101.

Figure 2:
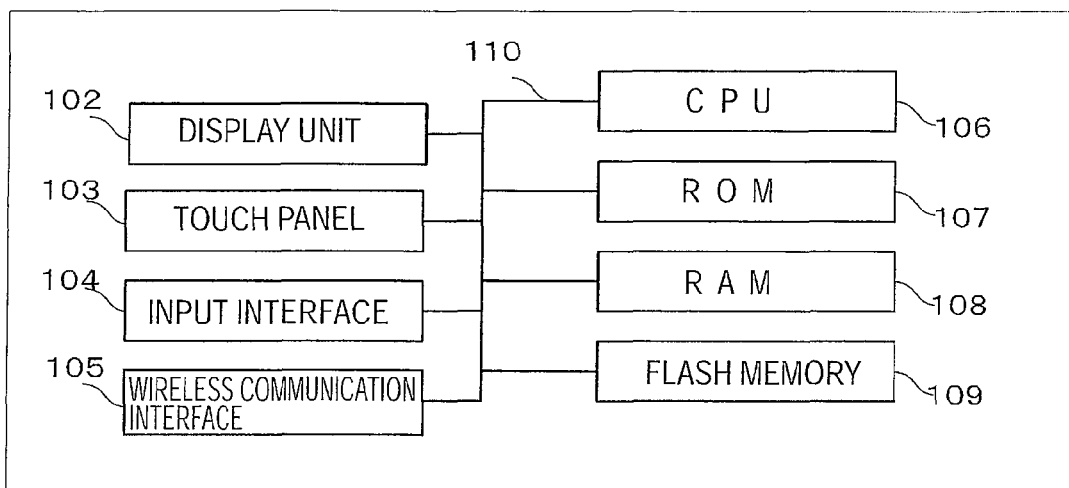
FIG. 2 is a block diagram showing the electrical structure of the data processor of FIG. 1.

FIG. 2 is a block diagram showing the electrical structure of the data processor 100. The data processor 100 includes a display unit 102, the touch panel 103, the input interface 104, a wireless communication interface 105, a CPU 106, a ROM 107, a RAM 108, and a flash memory 109. The components of the data processor 100 are interconnected via an I/O port 110.

The display unit 102 provides the display area 101. The display unit 102 receives image signals outputted from the CPU 106 and displays an image in the display area 101 based on these signals. The display unit 102 may be configured of a liquid crystal display (LCD) or an organic electroluminescence (EL) panel, for example.

The touch panel 103 is formed of a transparent member disposed so as to cover the surface of the display area 101. When a user touches the touch panel 103 using a finger or the like, the touch panel 103 detects the touched position and outputs data for the detected position to the CPU 106. In the following description, an event in which the CPU 106 receives position data from the touch panel 103 will be expressed as "the CPU 106 receiving touch data" or the like.

The input interface 104 is configured of a button, for example, that activates the data processor 100 when pressed.

Figure 3:
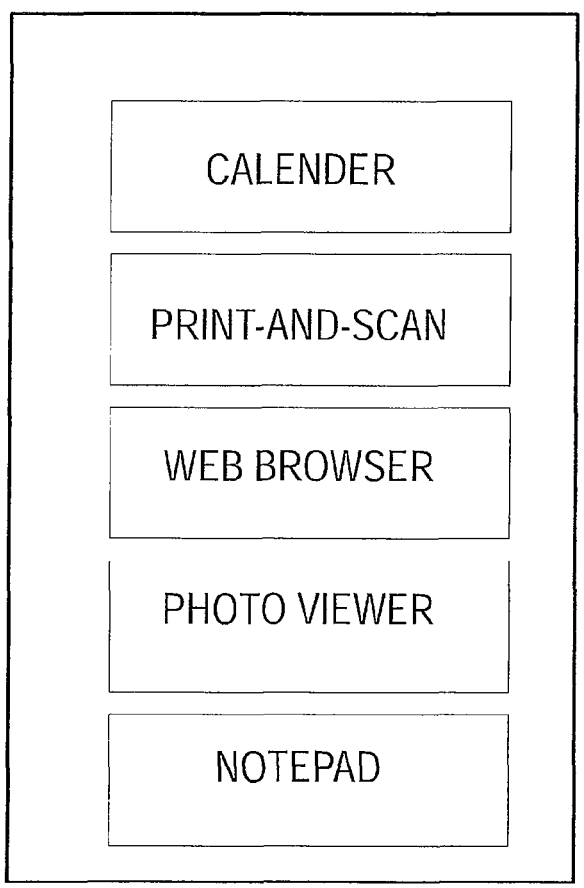
FIG. 3 shows an example of application icons displayed in a display area of the data processor.

The CPU 106 controls each component connected to the I/O port 110 based on programs stored in the ROM 107 and flash memory 109. The ROM 107 stores programs that are executed by the CPU 106. The RAM 108 temporarily stores data required for processes performed by the CPU 106. The flash memory 109 is nonvolatile memory capable of storing image data, text data, and the like. As will be described later in greater detail, the flash memory 109 also stores identification data identifying the default device for each application. The flash memory 109 may also store a variety of application programs (hereinafter simply referred to as "applications"). The variety of applications includes a print-and-scan application according to the present embodiment. Icons for the applications stored in the flash memory 109 are displayed in the display area 101. FIG. 3 shows an example of application icons displayed in the display area 101. In this example, icons are displayed for a calendar application, the print-and-scan application, a Web browser application (Internet browser application), a photo viewer application, and a notepad application. When the user touches a region in which the icon of a desired application is displayed, the CPU 106 launches the corresponding application.

Figure 4:
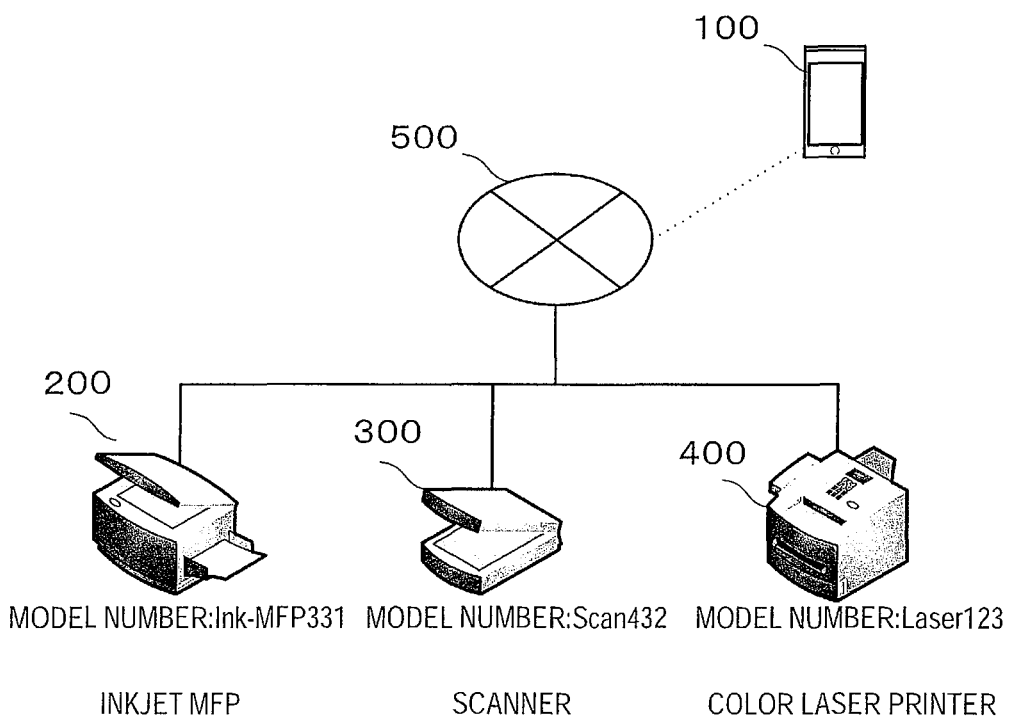
FIG. 4 is a conceptual diagram showing the connections between the data processor and devices that communicate with the data processor.

FIG. 4 is a conceptual diagram showing the connections between the data processor 100 and devices that communicate with the data processor 100. The data processor 100 can communicate with an access point 500 via the wireless communication interface 105 through wireless LAN communications. An inkjet multifunction peripheral (MFP) 200, a scanner 300, and a color laser printer 400 are connected to the access point 500. The inkjet MFP 200 is provided with a print function, a scan function, and a copy function. The data processor 100 is capable of executing the print-and-scan application to transmit a print request to the inkjet MFP 200 or color laser printer 400 via the access point 500 and to transmit a scan request to the inkjet MFP 200 or scanner 300 via the access point 500. In other words, the data processor 100 is capable of using the inkjet MFP 200, scanner 300, and color laser printer 400 via the access point 500.

Figure 5:
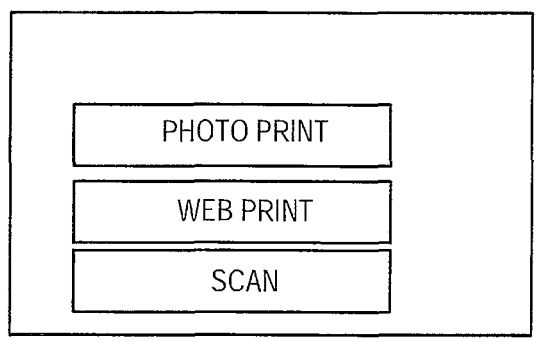
FIG. 5 shows an example of a Function Selection window that is displayed in the display area.

FIG. 5 shows a Function Selection window that is displayed in the display area 101 after the print-and-scan application is launched. A function describes one use of a device. Hence, the user selects a desired function of the device in the Function Selection window. When the CPU 106 receives touch data for a region of the display area 101 in which a function icon is displayed, the CPU 106 determines that the function represented by the touched icon has been selected. If "Photo print" is selected, the data processor 100 executes a process hereinafter referred to as a photo print process to transmit a print request for printing JPEG, bitmap, GIF, or other image data to a device having a print function, directing the device to perform a printing operation. When "Web print" is selected, the data processor 100 performs a process hereinafter referred to as a Web page print process for directing a device to perform a printing operation by transmitting a Web page print request to a device having a print function. When "Scan" is selected, the data processor 100 performs a process hereinafter referred to as a scan process for directing a device to perform a scanning operation by transmitting a scan request to a device having a scan function.

Figure 6:
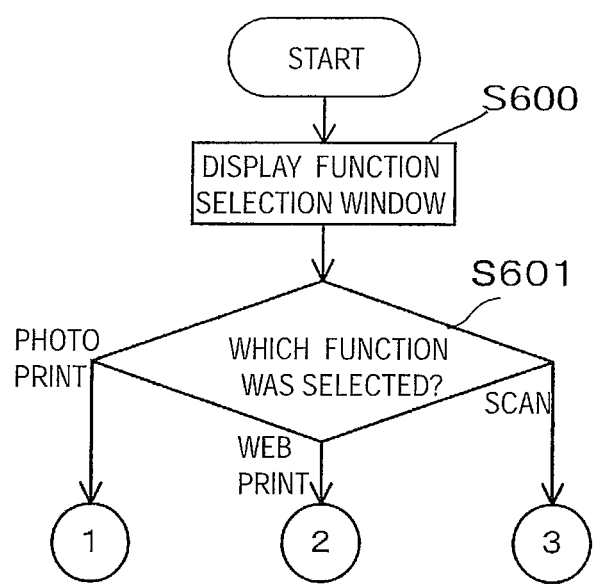
FIG. 6 is a flowchart showing a part of a process executed by a CPU in the data processor according to a print-and-scan application program of the first embodiment.

Next, processes for controlling various components of the data processor 100 executed by the CPU 106 according to the print-and-scan application will be described with reference to FIGS. 6 through 16E. FIG. 6 illustrates steps in a process performed by the CPU 106 after the print-and-scan application is launched. First, in S600 of FIG. 6, the CPU 106 displays the Function Selection window of FIG. 5. Then, in S601, the CPU 106 determines the function selected by the user from among photo print, Web print, and scan. The CPU 106 proceeds to branch "1" (see FIG. 7) when photo print was selected (S601: photo print), branch "2" (see FIG. 10) when Web print was selected (S601: Web print), and branch "3" (see FIG. 13) when scan was selected (S601: scan).

The process performed when proceeding to branch "1" will be described with reference to the flowchart in FIG. 7. In S701 the CPU 106 displays a list of thumbnails on the display area 101 for image data stored in the flash memory 109. When it is not possible to display all of the thumbnails in the display area 101 at one time, the display may be configured so that the user can view all thumbnails by scrolling.

In S702 the CPU 106 determines whether a selection for image data was received from the user while the thumbnails for image data are displayed in the display area 101. That is, the CPU 106 determines whether the user touched a region of the display area 101 in which a thumbnail is displayed. When such a region was touched, the CPU 106 determines that a selection was received, i.e., that the user selected image data corresponding to the thumbnail displayed in the touched region. The CPU 106 continues to loop back to S702 and repeat the determination while determining that an image data selection has not been received (S702: NO). Once the CPU 106 determines that a selection has been received (S702: YES), the CPU 106 advances to S703.

In S703 the CPU 106 determines whether identification data is stored in the flash memory 109 identifying the default device for printing photographs. The photo print default device is preset in order to reduce the number of operations a user must perform to select a device when issuing a print request for a photo print process. When transmitting a photo print request to a device, the data processor 100 transmits a packet that includes the IP address of the device as the destination address and the IP address of the data processor 100 as the source address. Next, the CPU 106 associates the IP address of the destination device with the model number of this device and stores this association in a memory area A of the flash memory 109 that serves to store identification data for the photo print default device. In other words, if a photo print request was previously transmitted to a device, the IP address of the device is stored in the memory area A of the flash memory 109. However, if the data processor 100 has not yet performed a photo print process, an IP address for the device used to perform a photo print is not stored in the memory area A of the flash memory 109. The CPU 106 determines whether identification data has been stored for the photo print default device based on whether the IP address of the device is stored in the memory area A of the flash memory 109. The CPU 106 advances to S706 when determining in S703 that identification data has not been stored for a photo print default device (S703: NO) and advances to S704 when determining that identification data has been stored for a photo print default device (S703: YES).

Figures 16A, 16B:
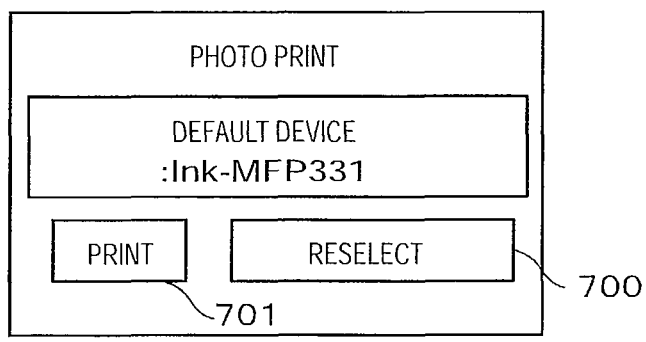
FIG. 16A shows a sample Print Command window that is displayed in the display area of the data processor.
FIG. 16B shows an example of data that is stored in a RAM of the data processor.

In S704 the CPU 106 displays a Print Command window in the display area 101 for accepting a print command from the user. FIG. 16A shows a sample Print Command window. The CPU 106 displays the model number of the photo print default device in the Print Command window together with icons 700 and 701. The Reselect icon 700 is a button for issuing a request to reselect the default device. By selecting the Reselect icon 700, the user can select a different device as the default device for photo printing, and the CPU 106 will store identification data for the selected device in the flash memory 109 when identification data for a device is already stored in the flash memory 109 as the default device. More specifically, when the user selects a different device as the photo print default device, the CPU 106 overwrites the identification data currently stored in the flash memory 109 with identification data for the newly selected device. The Print icon 701 is selected to issue a print command.

In S705 the CPU 106 determines whether a request was received to reselect the photo print default device. Specifically, the CPU 106 determines whether the user touched the region in which the Reselect icon 700 is displayed. If the user touched this region, the CPU 106 determines that a request for reselecting the default device was received. The CPU 106 advances to S706 upon determining that a reselect request was received (S705: YES) and advances to S709 upon determining that a reselect request was not received (S705: NO).

In S706 the CPU 106 displays the model numbers of selectable devices in the display area 101. More specifically, the CPU 106 controls the wireless communication interface 105 to broadcast a packet over the network to which the data processor 100 is connected requesting devices to return their model numbers and information related to the functions they possess. In response, the requested data is returned from each device connected to the network. The wireless communication interface 105 receives a packet from each device that includes the model number of the device and information related to its functions. The packet received by the wireless communication interface 105 includes the IP address of the device as the source address and the IP address of the data processor 100 as the destination address. The CPU 106 correlates and stores in the RAM 108 the model number, functional information, and IP address of the device received by the wireless communication interface 105. FIG. 16B shows an example of data that the CPU 106 stores in the RAM 108 in the embodiment. Based on the data stored in the RAM 108, the CPU 106 extracts model numbers for devices connected to the data processor 100 via the network that possess a color print function. The CPU 106 displays a list of the extracted model numbers in the display area 101. In this example, the CPU 106 displays model numbers for two devices in the display area 101 since the inkjet MFP 200 (model number: Ink-MFP331) and the color laser printer 400 (model number: Laser123) are the only devices that possess a color print function, as shown in FIG. 16B. Here, the CPU 106 is configured to extract only devices possessing a color print function since a photo print is normally performed in color.

In S707 the CPU 106 determines whether the user has selected a device. Specifically, the CPU 106 determines whether the user touched any region in the display area 101 corresponding to one of the model numbers displayed in the window in S706. When a region in the display area 101 was touched, the CPU 106 determines that the device having the model number displayed in the touched region was selected. The CPU 106 advances to S708 upon determining that a device was selected (S707: YES) and continues to repeat the determination in S707 when determining that no selection has been made (S707: NO).

In S708 the CPU 106 identifies the device selected in S707, stores the IP address of the selected device in the memory area A of the flash memory 109 in correlation with the model number of the device, and displays the Print Command window (FIG. 16A) on the display area 101. Thus, the CPU 106 stores identification data for the selected device as identification data for the photo print default device in the flash memory 109, thereby registering the photo print default device.

In S709 the CPU 106 determines whether a print command was received. Here, the CPU 106 determines whether the user touched the region in the display area 101 in which the Print icon 701 for issuing a print command is displayed. If the user touched the region in which the Print icon 701 is displayed, the CPU 106 determines that a print command was inputted (S709: YES) and advances to S710. However, if the CPU 106 determines that a print command was not inputted (S709: NO), the CPU 106 returns to S705.

In S710 the CPU 106 sets the destination to the IP address read from the memory area A of the flash memory 109 and controls the wireless communication interface 105 to transmit a print request to the photo print default device for printing the image data selected in S702.

In S711 the CPU 106 performs a process to store identification data for a Web print default device. This process is a subroutine and will be described here with reference to FIG. 8. In S1001 of FIG. 8, the CPU 106 determines whether identification data for a Web print default device is currently stored in the flash memory 109. The Web print default device is a device that is preset in order to reduce the number of user operations for selecting devices when transmitting a print request to perform a Web page print process.

As with the photo print default device, a memory area B is allocated in the flash memory 109 for storing identification data identifying the default device for printing Web pages (Web print default device). If a print request to print a Web page was previously transmitted to a device, the IP address of that device is already stored in the memory area B of the flash memory 109. However, if the data processor 100 has not yet performed a Web page print process, an IP address for a default device has not yet been stored in the memory area B of the flash memory 109. Accordingly, in S1001 the CPU 106 determines whether identification data has been stored for a Web print default device according to the same method described in S703.

If identification data has not yet been stored for a Web print default device (S1001: NO), in S1002 the CPU 106 stores the identification data for the photo print default device in the memory area B of the flash memory 109 as identification data for the Web print default device. In other words, the CPU 106 extracts the device IP address from the memory area A of the flash memory 109 and stores this IP address in the memory area B of the flash memory 109 in correlation with the model number of the device. Subsequently, the CPU 106 ends the subroutine process. However, if identification data has already been stored for a Web print default device (S1001: YES), the CPU 106 ends the subroutine process without taking any action.

The CPU 106 stores the IP address of the photo print default device as identification data for the Web print default device in S1002 for the following reason. Normally, a device capable of performing color printing is selected as the default device for photo printing. On the other hand, the device selected as the default device for Web page printing might be a device capable of performing color printing or a device capable of only monochrome printing. In other words, the device selected as the photo print default device may be regarded as sufficiently satisfying the conditions of a Web print default device.

Figure 7:
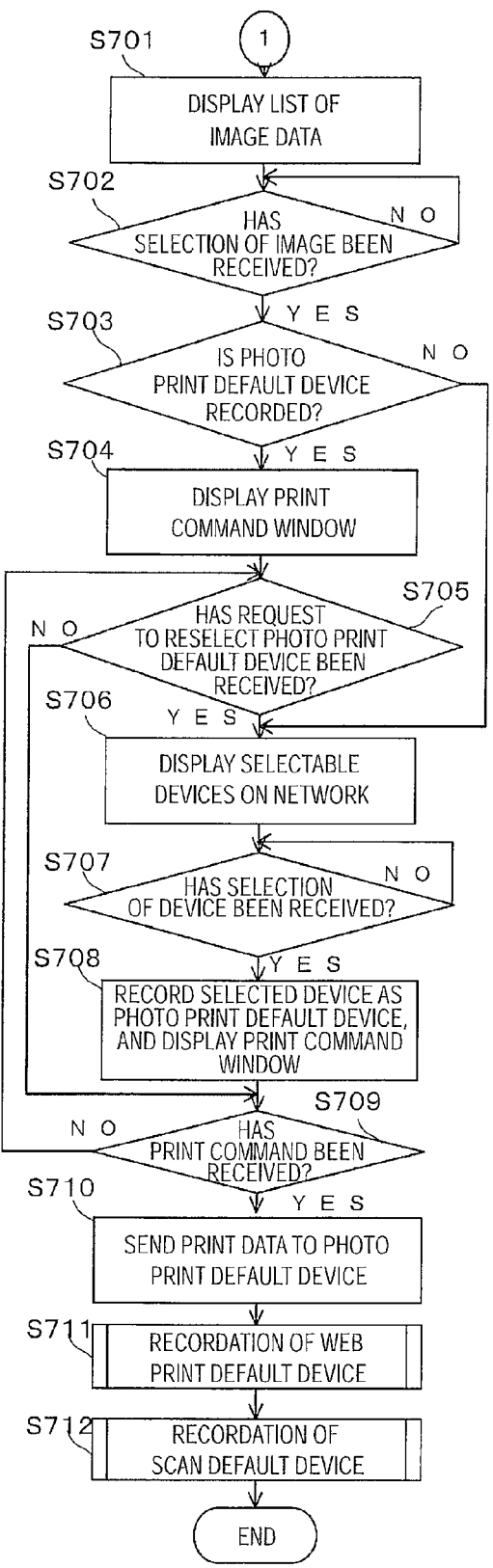
FIG. 7 is a flowchart showing a remaining process that is executed by the CPU when the process proceeds to branch "1" in FIG. 6.
Figure 8:
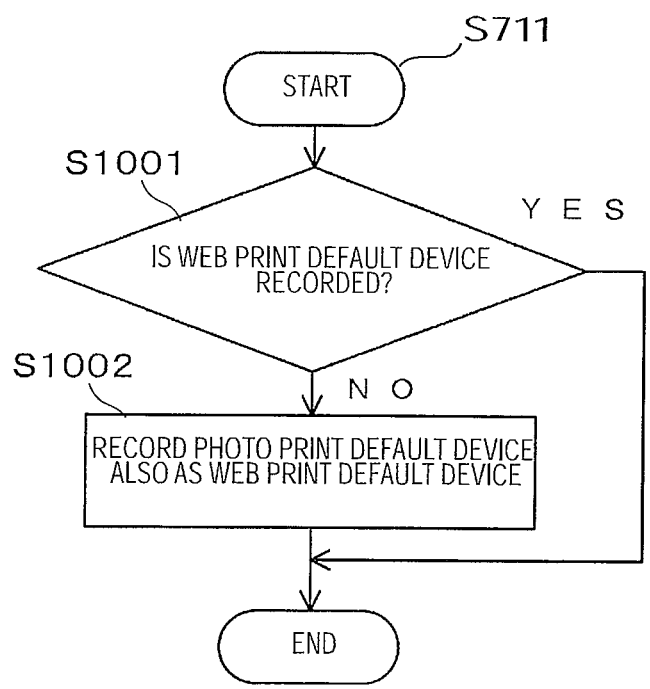
FIG. 8 is a flowchart showing a process executed in the process of FIG. 7 to store identification data for a Web print default device.

After completing the subroutine in FIG. 8, the CPU 106 advances to S712 of FIG. 7 and performs another subroutine process for storing identification data identifying the default device for scans. The subroutine process in S712 will be described here with reference to the flowchart in FIG. 9.

Figure 9:
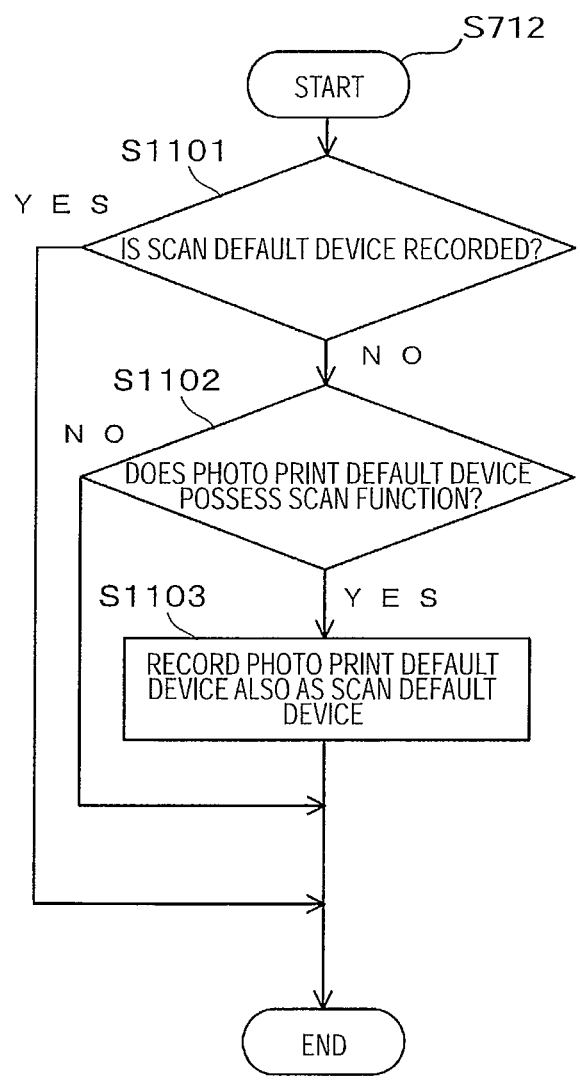
FIG. 9 is a flowchart showing a process executed in the process of FIG. 7 to store identification data for a scan default device.

In S1101 of FIG. 9, the CPU 106 determines whether identification data for a scan default device is currently stored in the flash memory 109. A scan default device is a device that is preset in order to reduce the number of operations a user performs to select devices when the data processor 100 transmits a scan request. As with the photo print default device and the Web print default device, a memory area C is allocated in the flash memory 109 for storing identification data identifying a scan default device. If the data processor 100 has previously issued a scan request, the IP address for the device indicated as the destination of the scan request is already stored in the memory area C of the flash memory 109 as the identification data. However, if the data processor 100 has not yet issued a scan request, the IP address of a scan default device is not yet stored in the memory area C of the flash memory 109.

Accordingly, in S1101 the CPU 106 determines whether identification data has been stored for a scan default device according to the same method as described in S703. The CPU 106 ends the current subroutine when determining that identification data is stored for a scan default device (S1101: YES) and advances to S1102 when identification data has not been stored for a scan default device (S1101: NO).

In S1102 the CPU 106 determines whether the photo print default device is equipped with a scan function based on data that was stored in the RAM 108 in S706. If the device possesses a scan function (S1102: YES), in S1103 the CPU 106 stores the identification data for the photo print default device in the flash memory 109 as identification data for the scan default device. In other words, the CPU 106 extracts the device IP address from the memory area A of the flash memory 109 and stores this address in the memory area C of the flash memory 109 in association with the device model number. However, if the photo print default device does not possess a scan function (S1102: NO), the CPU 106 ends the current subroutine process.

Figure 16C:
FIG. 16C shows a sample Web page that is displayed in the display area.

Next, the process performed when the CPU 106 proceeds to branch "2" based on the selection in S601 of FIG. 6 will be described with reference to the flowchart in FIG. 10. In S801 of FIG. 10, the CPU 106 displays the specified Web page in the display area 101. The method of displaying the Web page is not an essential component of the present invention and will not be described here. FIG. 16C shows a sample Web page displayed by the CPU 106 in the display area 101. In addition to the Web page, the CPU 106 displays the URL of the Web page and a Print icon 800 in the display area 101. The user selects the Print icon 800 to print the currently displayed Web page.

In S802 the CPU 106 determines whether a command to print the Web page was received, i.e., whether the user has touched the region of the display area 101 in which the Print icon 800 is displayed. If the user has touched the display region for the Print icon 800, the CPU 106 determines that a command has been received to print the currently displayed Web page. The CPU 106 advances to S803 when such a command was received (S802: YES) and repeatedly returns to S802 upon determining that a command to print the Web page was not received (S802: NO).

In S803 the CPU 106 determines according to the same method described for S703 whether identification data has been stored for a Web print default device. The CPU 106 advances to S806 when determining that identification data has not been stored for the Web print default device (S803: NO) and advances to S804 when determining that such identification data has been stored (S803: YES).

In S804 the CPU 106 displays a Print Command window similar to that shown in FIG. 16A in the display area 101.

In S805 the CPU 106 determines according to the same method described in S705 whether the user issued a request to reselect the Web print default device, The CPU 106 advances to S806 when determining that a reselect request was received (S805: YES) and advances to S809 when determining that a reselect request was not received (S805: NO).

In S806 the CPU 106 displays a list of the model numbers of devices possessing a print function on the display area 101 according to the same method described in S706.

In S807 the CPU 106 determines according to the same method described in S707 whether the user has selected a device. The CPU 106 advances to S808 when determining that a selection was received (S807: YES) and continually repeats the determination in S807 when determining that a selection was not received (S807: NO).

In S808 the CPU 106 identifies the device selected in S807, stores the IP address of the identified device in the memory area B of the flash memory 109 in correlation with the model number of the device, and displays the Print Command window in the display area 101 according to the same method described in S708.

In S809 the CPU 106 determines whether a print command was inputted according to the same method described in S709. The CPU 106 advances to S810 when determining that a print command was inputted (S809: YES) and returns to S805 when determining that a print command was not inputted (S809: NO).

In S810 the CPU 106 sets the destination to the IP address read from the memory area B of the flash memory 109 and controls the wireless communication interface 105 to transmit a print request to the Web print default device requesting the Web page targeted in the print command.

In S811 the CPU 106 performs a subroutine process for storing identification data for the photo print default device. The subroutine process of S811 will be described here with reference to FIG. 11. In S1201 of FIG. 11, the CPU 106 determines according to the same method described in S703 whether identification data for the photo print default device is stored in the flash memory 109. The CPU 106 advances to S1202 when identification data is not stored for the photo print default device (S1201: NO) and ends the subroutine process without taking any action when such identification data is stored (S1201: YES).

In S1202 the CPU 106 determines whether the Web print default device to which the print request was transmitted in S810 is an inkjet printer based on data previously stored in the RAM 108 in S806. The CPU 106 advances to S1205 when the Web print default device is an inkjet printer (S1202: YES) and advances to S1203 when the Web print default device is not an inkjet printer (S1202: NO).

In S1203 the CPU 106 determines whether the Web print default device is a color laser printer based on the data stored in the RAM 108 in S806. The CPU 106 advances to S1204 when the Web print default device is a color laser printer (S1203: YES) and ends the current subroutine process when the Web print default device is not a color laser printer (S1203: NO).

Figure 16D:
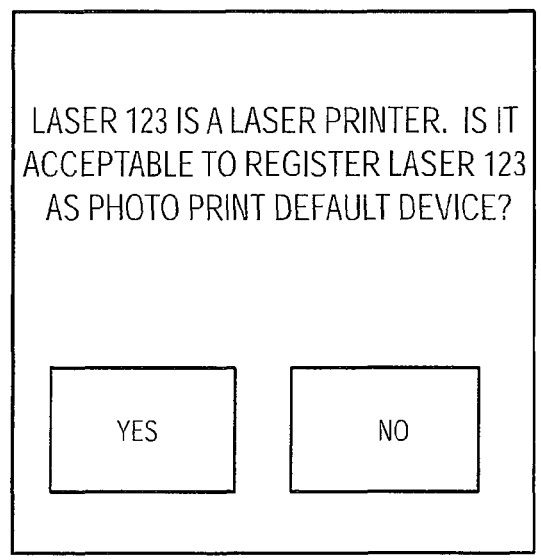
FIG. 16D shows a sample message displayed in the display area in the process of FIG. 11.

In S1204 the CPU 106 displays a message querying the user whether it is OK to store the IP address of the color laser printer corresponding to the Web print default device displayed in the display area 101 as identification data for the photo print default device. FIG. 16D shows a sample message displayed in the display area 101 in S1204. If the user touches the display area 101 in the region displaying an icon that gives permission ("Yes" icon in FIG. 16D), the CPU 106 determines that the user has given permission to store the IP address for the color laser printer (i.e., the Web print default device) as identification data for the photo print default device. On the other hand, if the user touches the display area 101 in a region displaying an icon that does not give permission ("No" icon in FIG. 16D), the CPU 106 determines that the user has not given permission to store this IP address as identification data for the photo print default device. The CPU 106 advances to S1205 when the user gives permission to store the IP address of the Web print default device as the identification data for the photo print default device (S1204: YES) and ends the subroutine process when permission was not given (S1204: NO).

In S1205 the CPU 106 stores identification data for the Web print default device as the identification data for the photo print default device. Specifically, the CPU 106 extracts the device IP address from the memory area B of the flash memory 109 and stores this IP address in the memory area A of the flash memory 109 in association with the device model number. Subsequently, the CPU 106 ends the subroutine process.

Figure 10:
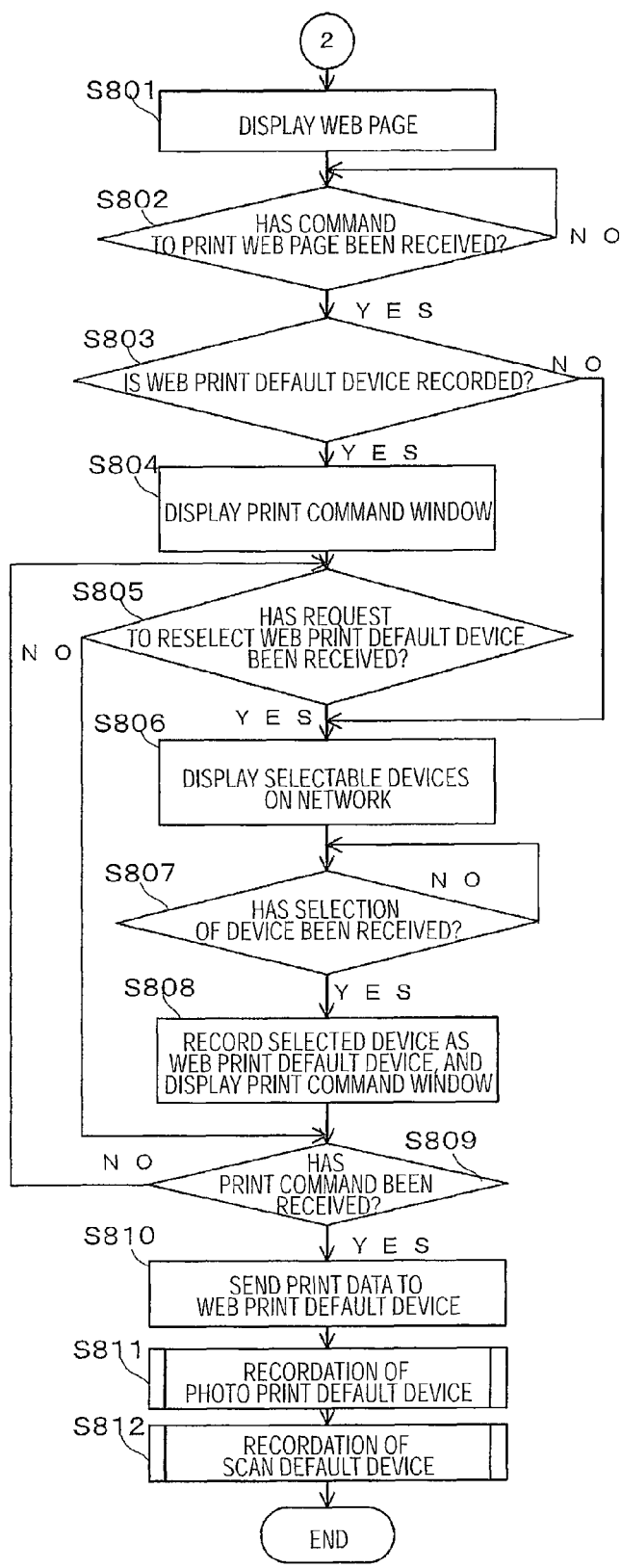
FIG. 10 is a flowchart showing a remaining process that is executed by the CPU when the process proceeds to branch "2" in FIG. 6.
Figure 11:
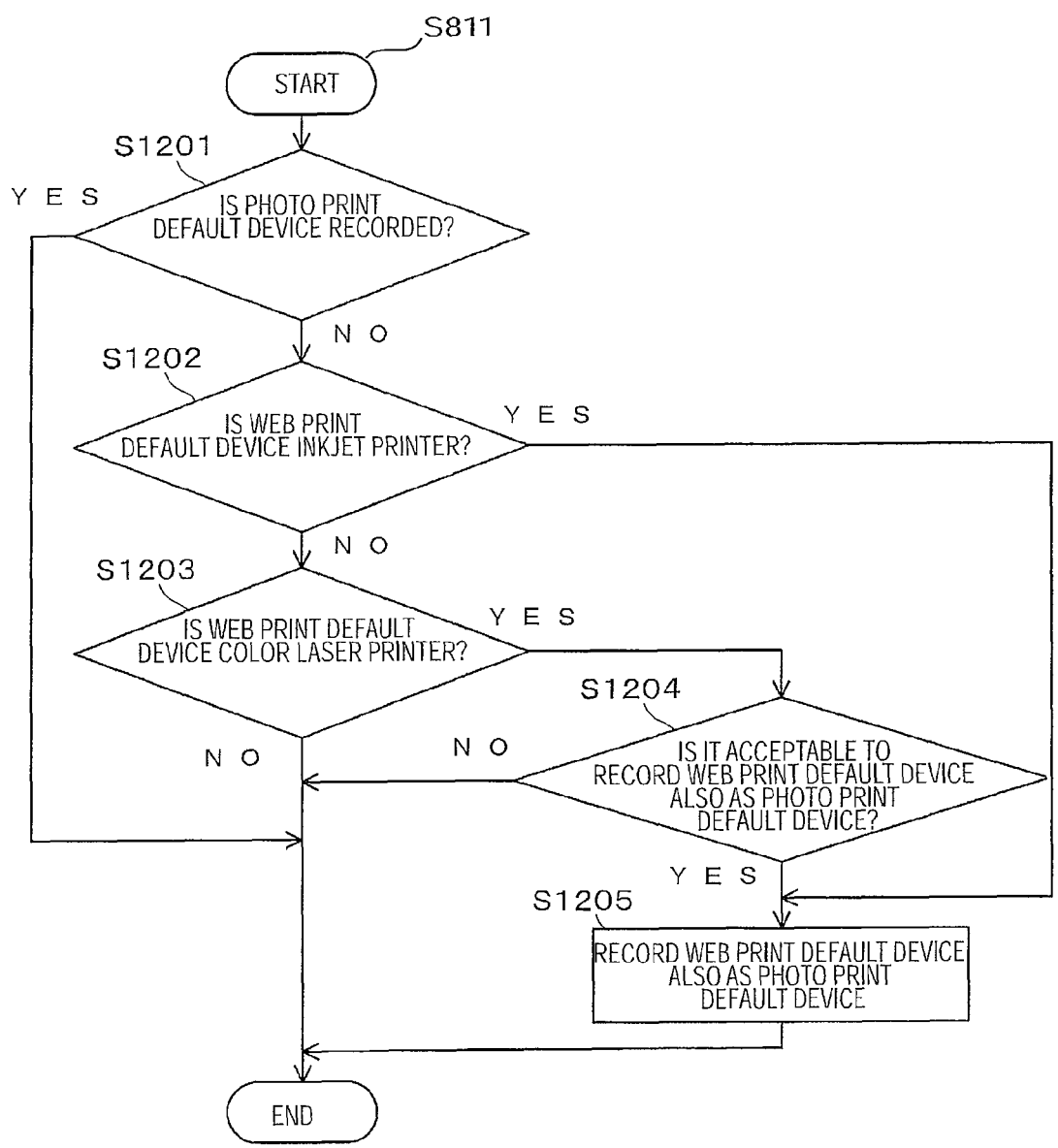
FIG. 11 is a flowchart showing a process executed in the process of FIG. 10 to store identification data for a photo print default device.

Unlike in the process described in FIG. 8, in the process of FIG. 11 the CPU 106 first determines whether the Web print default device meets a certain condition and stores the IP address of this Web print default device as identification data for the photo print default device only when the condition is met. The CPU 106 checks this condition for the following reason. Ordinarily a Web print default device must be provided with a monochrome print function at the minimum. Therefore, in S806 of FIG. 10, the CPU 106 is configured to display on the display area 101 all devices possessing a print function that are connected to the network. If the CPU 106 were to store the IP address of the Web print default device unconditionally as the identification data for the photo print default device in FIG. 11, there is a possibility that the CPU 106 may store the IP address for a device that possesses only a monochrome print function as the identification data for the photo print default device.

After completing the subroutine in FIG. 11, the CPU 106 advances to S812 in FIG. 10 and performs a process to store identification data for the scan default device. This process is also a subroutine and will be described here with reference to FIG. 12.

Figure 12:
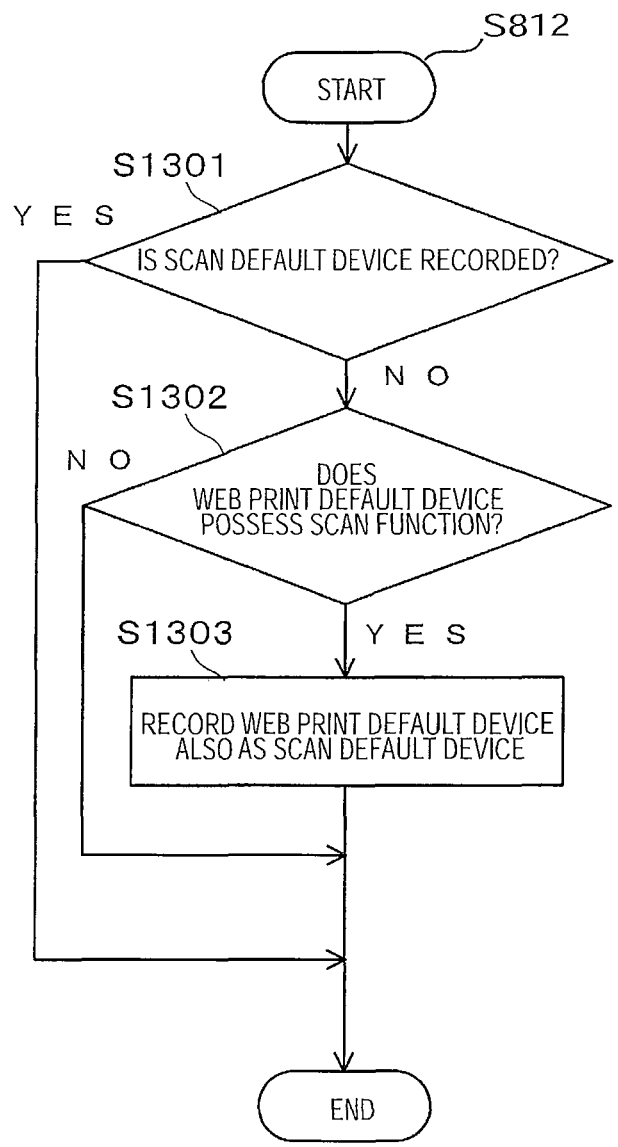
FIG. 12 is a flowchart showing a process executed in the process of FIG. 10 to store identification data for a scan default device.

In S1301 of FIG. 12, the CPU 106 determines according to the same method described in S703 whether identification data has been stored for the scan default device. If identification data has been stored for the scan default device (S1301: YES), the CPU 106 ends the subroutine process. However, if identification data has not yet been stored for the scan default device (S1301: NO), in S1302 the CPU 106 determines whether the Web print default device possesses a scan function based on the data stored in the RAM 108 in S806. If the Web print default device has a scan function (S1302: YES), in S1303 the CPU 106 stores the identification data for the Web print default device as the identification data for the scan default device. Specifically, the CPU 106 stores the device IP address stored in the memory area B of the flash memory 109 in the memory area C of the flash memory 109 in association with the device model number. However, if the Web print default device does not possess a scan function, the CPU 106 simply ends the subroutine process, returns again to the flowchart shown in FIG. 10, and ends the process of FIG. 10.

Next, the process performed by the CPU 106 after proceeding to branch "3" in S601 of FIG. 6 will be described with reference to FIG. 13. In S901 of FIG. 13, the CPU 106 determines according to the same method described in S703 whether identification data has been stored for the scan default device. The CPU 106 advances to S904 when determining that identification data has not been stored for the scan default device (S901: NO) and advances to S902 when determining that identification data has been stored for the scan default device (S901: YES).

Figures 16E, 17A:
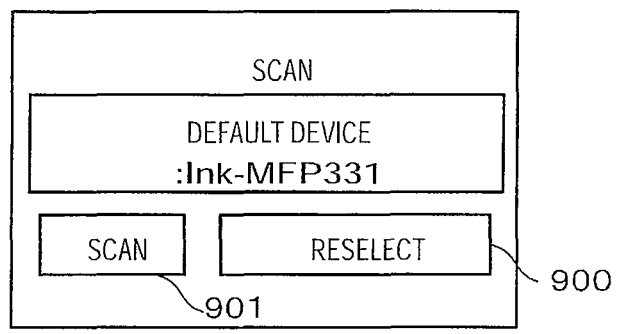
FIG. 16E shows a sample Scan Request Transmission Command window displayed in the display area.
FIG. 17A shows a table storing data type specifying information according to a second embodiment.

In S902 the CPU 106 displays a Scan Request Transmission Command window in the display area 101 for transmitting a scan request. FIG. 16E shows a sample screen displayed in the display area 101. In the example shown in FIG. 16E, the Scan Request Transmission Command window includes a Reselect icon 900, a Scan icon 901, and the model number of the scan default device. The user selects the Reselect icon 900 to issue a request for reselecting the default device and selects the Scan icon 901 to issue a command for transmitting the scan request.

In S903 the CPU 106 determines according to the same method described in S705 whether the user has requested to reselect the scan default device. The CPU 106 advances to S904 when determining that a reselection request was received (S903: YES) and advances to S907 when determining that a reselection request was not received (S903: NO).

In S904 the CPU 106 displays a list of model numbers for devices possessing a scan function in the display area 101 according to the same method described in S706.

In S905 the CPU 106 determines according to the same method described in S707 whether a device was selected. The CPU 106 advances to S906 when determining that a device selection was received (S905: YES) and repeats the determination in S905 when determining that a selection has not been received (S905: NO).

In S906 the CPU 106 identifies the device selected in S905, stores the IP address of the identified device in the memory area C of the flash memory 109 in association with the device model number, and displays the Scan Request Transmission Command window in the display area 101 according to the same method described in S708.

In S907 the CPU 106 determines according to the same method described in S709 whether a command was inputted to transmit the scan request. The CPU 106 advances to S908 when determining that a transmission command was inputted (S907: YES) and returns to S903 when determining that a transmission command was not inputted (S907: NO).

In S908 the CPU 106 sets the destination to the IP address read from the memory area C of the flash memory 109 and controls the wireless communication interface 105 to transmit a scan request to the scan default device having this IP address. In response, the wireless communication interface 105 receives scan data from the scan default device. The CPU 106 stores the scan data received by the wireless communication interface 105 in the flash memory 109 or the like.

In S909 the CPU 106 performs a process to store identification data for the Web print default device. This process is a subroutine and will be described here with reference to FIG. 14.

In S1401 of FIG. 14, the CPU 106 determines according to the same method described in S703 whether identification data has been stored for the Web print default device. The CPU 106 advances to S1402 when identification data has not yet been stored for the Web print default device (S1401: NO) and ends the subroutine process without taking any action when identification data is already stored for the Web print default device (S1401: YES).

In S1402 the CPU 106 determines whether the scan default device possesses a print function based on the data stored in the RAM 108 in S904. The CPU 106 advances to S1403 when determining that the scan default device possesses a print function (S1402: YES) and ends the subroutine with no further action when determining that the scan default device does not have a print function (S1402: NO).

In S1403 the CPU 106 stores identification data for the scan default device as identification data for the Web print default device. Specifically, the CPU 106 stores the device IP address stored in the memory area C of the flash memory 109 in the memory area B of the flash memory 109 in association with the model number of the device. Subsequently, the CPU 106 ends the subroutine process.

Figure 13:
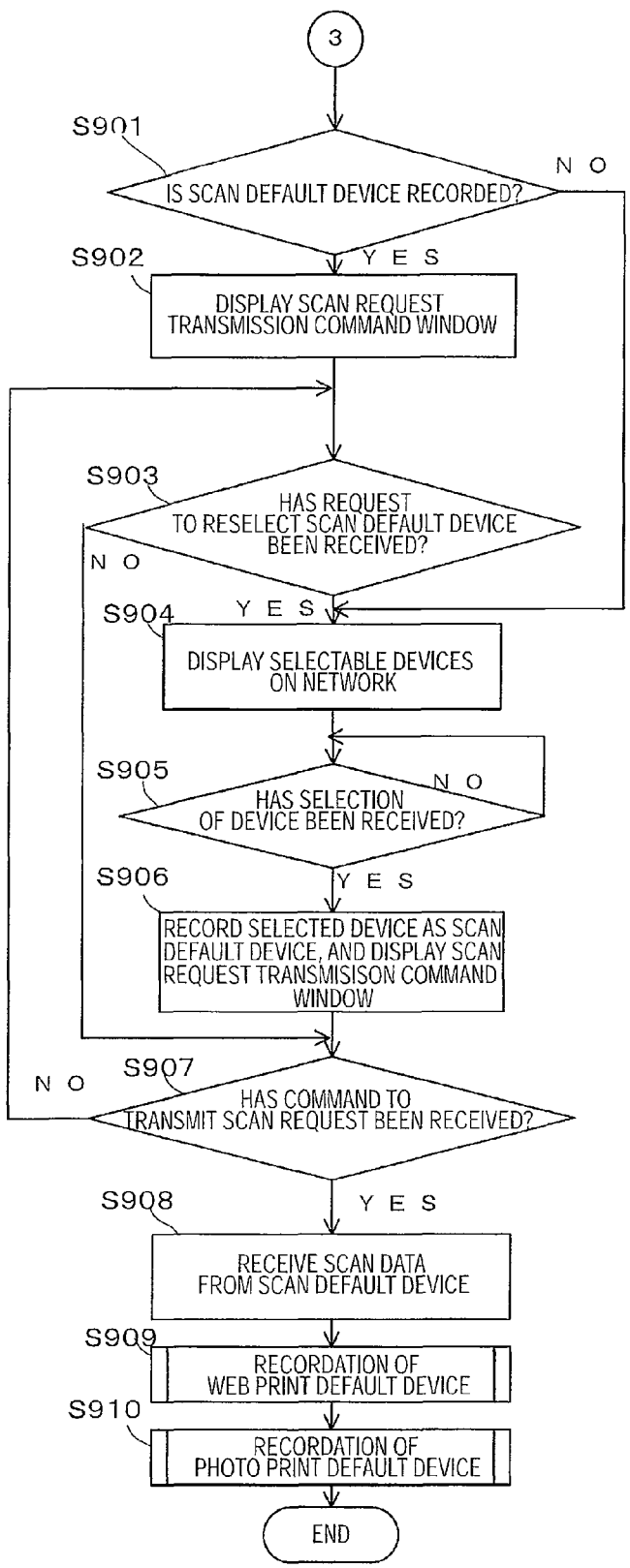
FIG. 13 is a flowchart showing a remaining process that is executed by the CPU when the process proceeds to branch "3" in FIG. 6.

After completing the subroutine process in FIG. 14, the CPU 106 returns to S910 of FIG. 13 and performs a process to store identification data for the photo print default device. This process is also a subroutine and will be described here with reference to FIG. 15. The steps in this subroutine process closely resemble those in the subroutine process shown in FIG. 11. The difference between these processes is only that the CPU 106 determines whether to store identification data for the Web print default device as identification data for the photo print default device in the process of FIG. 11, whereas the CPU 106 determines whether to store identification data for the scan default device as identification data for the photo print default device in the process of FIG. 15. Accordingly, a detailed description of the process in FIG. 15 will not be included here.

After completing the subroutine process in FIG. 15, the CPU 106 again returns to the flowchart in FIG. 13 and ends the process of FIG. 11

With the data processor 100 according to the embodiment described above, the CPU 106 can store identification data for default devices in the flash memory 109 for each available function of the data processor 100, including a photo print, a Web print, and a scan operation. Accordingly, the user can employ a suitable device for each function.

Further, after the CPU 106 of the data processor 100 stores identification data for a default device suited to one function, the CPU 106 can store the identification data as the default device for other functions after determining that the default device is suited for these functions. Thus, the data processor 100 reduces the number of steps that a user must perform in order to store data for devices suited to each available function.

<Second Embodiment>

In a second embodiment of the present invention, the data processor 100 can launch the print-and-scan application while data to be handled in the application has already been specified. The CPU 106 accepts a command to launch the print-and-scan application while a Web page is displayed in the display area 101 based on the Web browser application or while image data is displayed in the display area 101 according to the photo viewer application. An icon is provided in both the Web browser application and the photo viewer application for inputting a command to launch the print-and-scan application. When the user touches a region of the display area 101 in which the icon is displayed, the CPU 106 determines that a command has been issued to launch the print-and-scan application and begins a process based on the print-and-scan application.

According to the present embodiment, a plurality of types of data (image data and Web page data) is defined. A plurality of functions (photo print and Web print) is provided in one to one correspondence with the plurality of types of data. That is, photo print is assigned to image data, and Web print is assigned to Web page data.

When starting the process based on the print-and-scan application while a Web page is displayed in the display area 101, the CPU 106 reads a URL from a memory area of the display area 101 used for executing the Web browser application. The URL indicates the location of data on the Internet for the displayed Web page. The CPU 106 stores this URL in a memory area D (not shown) of the RAM 108 that is used when executing the print-and-scan application. Similarly, when the CPU 106 starts the process based on the print-and-scan application while image data is displayed in the display area 101, the CPU 106 reads location data indicating the absolute path of the displayed image data from a memory area of the RAM 108 used when executing the photo viewer application. The CPU 106 stores this location data in the memory area D of the RAM 108. Thus, both in the case where a Web page is displayed and in the case where image data is displayed, the CPU 106 stores location information indicative of the location of the displayed data (Web page data or image data) in the memory area D of the RAM 108.

According to the present embodiment, the flash memory 109 stores a Table 1 (data type specifying information) shown in FIG. 17A together with the program of the print-and-scan application. The Table 1 shows that location information including "http://" is URL, and that location information including an extension of image data, such as ".bmp", ".jpg", or ".gif", is location data (absolute path) for image data. In this way, the Table 1 indicates that if location information for data to be processed includes "http://", the location information is URL and therefore the data to be processed is web page data. The Table 1 further indicates that if location information for data to be processed includes an extension of image data, such as ".bmp", ".jpg", or ".gif", the location information is location data (absolute path) for image data and therefore the data to be processed is image data.

Next, a process executed by the CPU 106 according to the print-and-scan application for controlling components of the data processor 100 will be described with reference to FIG. 17B. This process begins when the CPU 106 launches the print-and-scan application while executing a process according to the Web browser application or the photo viewer application. In S1600 of FIG. 17B, the CPU 106 first acquires the location information from the memory area D of the RAM 108. In S1601, the CPU 106 determines whether the acquired location information is a URL or location data for image data. More specifically, in S1601, the CPU 106 refers to the Table 1 (FIG. 17A) based on the acquired location information. If the acquired location information includes "http://", the CPU 106 determines that the location information is a URL. If the acquired location information includes an extension of image data, such as ".bmp", ".jpg", or ".gif", the CPU 106 determines that the location information is location data for image data.

If the acquired location information is a URL (S1601: URL), it is known that a type of data to be processed is Web page data and that a Web page function should be executed onto the Web page data. So, the CPU 106 advances to S1612, in order to perform a Web page print process to acquire the Web page data from the Internet and print the Web page. If the acquired location information is location data for image data (S1601: location data for image data), it is known that a type of data to be processed is image data and that a photo print function should be executed onto the image data. So, the CPU 106 then advances to S1602, in order to perform a photo print process on the image data specified by the location data.

The process in S1602-S1608 is identical to the process in S703-S709 described in FIG. 7 and will not be repeated here.

In S1602, similarly to S703, the CPU 106 judges whether the flash memory 109 records a default device for photo printing function. Because photo printing function corresponds to image data specified in S1601, it can be said that in S1602, the CPU 106 judges whether the flash memory 109 records a default device for the type of data specified in S1601. Then, if no default device for the specified type of data is recorded in the flash memory 109 (no in S1602), the CPU 106 acquires in S1605 identification data for at least one device that possesses photo print function similarly to S706. Because such a device that possesses photo print function can process image data, it can be said that the CPU 106 acquires identification data for at least one device that can process data of the specified type. Then, in S1607, similarly to S708, the CPU 106 stores, in the flash memory 109, identification data for the user's selected device from among the at least one device in correspondence with the photo print function. More specifically, in S1607, the CPU 106 identifies the device selected in S1606, stores the IP address of the selected device in the memory area A of the flash memory 109 in correlation with the model number of the device. Thus, the CPU 106 stores identification data for the selected device in correspondence with the function (photo print function) that corresponds to the specified type of data (image data). It can therefore be said that the CPU 106 stores identification data of the selected device in correspondence with the specified type of data.

In S1609 the CPU 106 sets the destination for a print request to the IP address of the photo print default device read from the memory area A of the flash memory 109 and controls the wireless communication interface 105 to transmit a print request to this destination for printing image data specified by the location data stored in the memory area D of the RAM 108.

The process in S1610 and S1611 is identical to that in S711 and S712 of FIG. 7, and a description of that process will not be repeated here.

It is noted that in S1610, similarly to S711, the CPU 106 first judges whether a default device is registered in correspondence with the web print function that is other than the photo print function (S1001). The photo print default device is registered also as the web print default device (S1002) if no web page default device is recorded (no in S1001). No registration is executed if a web page default device is already recorded (yes in S1001). In other words, the CPU 106 first judges whether a default device is recorded in correspondence with a data type (web page data) that is other than the image data that has been processed in S1609. The default device for the image data is registered also as the default device for web page data if no default device is recorded for web page data. Registration of the default device for web page data is not executed if a default device is already recorded for web page data.

The process in S1612-S1618 is identical to that described in S803-S809 of FIG. 10 and will not be repeated here.

In S1612, similarly to S803, the CPU 106 judges whether the flash memory 109 records a default device for web page printing function. Because web page printing function corresponds to web page data specified in S1601, it can be said that in S1612, the CPU 106 judges whether the flash memory 109 records a default device for the type of data specified in S1601. Then, if no default device for the specified type of data is recorded in the flash memory 109 (no in S1612), the CPU 106 acquires in S1615 identification data for at least one device that possesses web page print function similarly to S806. Because such a device that possesses web page print function can process web page data, it can be said that the CPU 106 acquires identification data for at least one device that can process data of the specified type. Then, in S1617, similarly to S808, the CPU 106 stores, in the flash memory 109, identification data for the user's selected device from among the at least one device in correspondence with the web page print function. More specifically, in S1617, the CPU 106 identifies the device selected in S1616, stores the IP address of the selected device in the memory area B of the flash memory 109 in correlation with the model number of the device. Thus, the CPU 106 stores identification data for the selected device in correspondence with the function (web page print function) that corresponds to the specified type of data (web page data). It can therefore be said that the CPU 106 stores identification data of the selected device in correspondence with the specified type of data.

In S1619 the CPU 106 sets the destination of a print request to the IP address of the Web print default device read from the memory area B of the flash memory 109 and controls the wireless communication interface 105 to transmit a print request to this destination for printing the Web page having the URL stored in the memory area D of the RAM 108.

The process in S1620 and S1621 is identical to that described in S811 and S812 of FIG. 10 and will not be repeated here.

It is noted that in S1620, similarly to S811, the CPU 106 first judges whether a default device is registered in correspondence with the photo print function that is other than the web print function (S1201). The web print default device may be registered also as the photo print default device (S1205) if no photo print default device is recorded (no in S1201). No registration is executed if a photo print default device is already recorded (yes in S1201). In other words, the CPU 106 first judges whether a default device is recorded in correspondence with a data type (image data) that is other than the web page data that has been processed in S1619. The default device for the web page data may be registered also as the default device for image data if no default device is recorded for image data. Registration of the default device for image data is not executed if a default device is already recorded for image data.

With the data processor 100 according to the second embodiment described above, the CPU 106 can store identification data of default devices suitable for the various types of data for which output commands are received. Accordingly, the user can employ a device suited to the type of data being outputted.

After storing identification data of a default device for one type of data, the CPU 106 can store the same identification data as the default devices for other types of data or other functions after determining that the device is suited for the other types of data or functions. Accordingly, the data processor 100 according to the second embodiment can easily register devices suitable for each type of data and function through fewer user operations.

In the above description, the plurality of memory areas A, B, and C are allocated in the flash memory 109 for storing identification data for default devices of the plurality of different functions (photo print, web page print, and scan), respectively. However, a plurality of memory areas may be allocated in the flash memory 109 for storing identification data for default devices for processing a plurality of different types of data. For example, the memory area A may be allocated in the flash memory 109 for storing identification data for a default device for processing image data, while the memory area B is allocated in the flash memory 109 for storing identification data for a default device for processing web page data. Also in such a variation, similarly to the second embodiment described above, identification data of the device selected in S1606 for image data is stored in S1607 in the memory area A, and identification data of the device selected in S1616 for web page data is stored in S1617 in the memory area B. It can therefore be said that identification data of the device selected in S1606 is stored in S1607 in correspondence with the type of the data to be processed, and identification data of the device selected in S1616 is stored in S1617 in correspondence with the type of the data to be processed. In addition, identification data of the device selected in S1606 for image data may be stored also in the memory area B in S1610. Identification data of the device selected in S1616 for web page data may be stored also in the memory area A in S1620. So, it can be said that identification data of a default device can be stored in correspondence with each type of data.

<Variations of the Embodiments>

While only a single input interface 104 is provided on the data processor 100 shown in FIG. 1, the data processor 100 may be provided with a plurality of input interfaces 104 instead. In this case, where it is described in the first and second embodiments that the CPU 106 receives the user's input from the touch panel 103, the CPU 106 may be configured to receive input from the plurality of input interfaces 104. Further, the functions of the touch panel 103 and input interfaces 104 may be combined.

The data processor 100 may be configured to communicate with devices through cables rather than wirelessly.

The devices connected to the data processor 100 are not limited to the inkjet MFP 200, scanner 300, and color laser printer 400 shown in FIG. 4, provided that there are at least devices that possess a print function and a scan function.

Devices may communicate with the access point 500 either through cables or wirelessly. Alternatively, the devices may communicate directly with the data processor 100 rather than through the access point 500. In this case, the devices may communicate with the data processor 100 either through cables or wirelessly.

In S706 of FIG. 7, data received by the data processor 100 related to the device model numbers and functions may be configured of data received only from devices possessing a color print function. More specifically, the CPU 106 controls the wireless communication interface 105 to broadcast a packet over the network to which the data processor 100 is connected requesting devices possessing a color print function to return their model numbers and information related to the functions they possess. In response, the requested data is returned only from devices connected to the network having a color print function. The wireless communication interface 105 receives data related to the device model number and functions returned from only these devices. The CPU 106 stores the model number and functional information received by the wireless communication interface 105 in the RAM 108. The CPU 106 displays a list in the display area 101 of all extracted model numbers for devices stored in the RAM 108. This process may also be applied to S806 in FIG. 10, S904 in FIG. 13, and S1605 and S1615 in FIG. 17B.

In the first and second embodiments described above, the data processor 100 is configured to issue a request to devices connected on the network for their model numbers and information related to the functions they possess and to receive these model numbers and functional information returned from the devices in response. However, the model numbers and functional information for all devices that the data processor 100 can use when executing the print-and-scan application may be preprogrammed in the print-and-scan application. In this case, the data processor 100 may be configured to perform the following process in S706 of FIG. 7, for example. The wireless communication interface 105 receives the model numbers of devices connected to the network. The CPU 106 compares the model numbers of devices preprogrammed in the print-and-scan application with the model numbers received by the wireless communication interface 105 for devices connected to the network and extracts all matching model numbers. Next, the CPU 106 reads information related to the functions of devices having the extracted model numbers from the print-and-scan application. Next, the CPU 106 stores functional information for devices having the extracted model numbers in the RAM 108 in association with their model numbers and the IP addresses of devices connected to the network. The information stored in the RAM 108 is identical to that shown in FIG. 16B, as described in the first embodiment. Next, the CPU 106 extracts the model numbers of devices connected to the network that have a print function based on the information stored in the RAM 108. The CPU 106 displays a list of the extracted model numbers in the display area 101.

The model numbers of devices preprogrammed in the print-and-scan application need not perfectly match the model numbers of devices connected to the network, i.e., the CPU 106 may be configured to extract model numbers showing a partial match. For example, if the model number of a device provided in the print-and-scan application is "Ink-MFP331," while the model number of a device connected to the network is "Ink-MFP431," it is clear that the two devices belong to the same series, since their model numbers both begin with "Ink-MFP." Since it is likely that the device "Ink- MFP431" possesses an inkjet color print function, scan function, and copy function, the model number for the device "Ink-MFP431" may be extracted as a device identical to the device having model number "Ink-MFP331," which is pre-programmed in the print-and-scan application.

The model number may be any type of identifier that can distinguish devices. For example, the model number may be configured of only symbols and need not include numbers. Further, a device name or other name capable of distinguishing a device may be used in place of the model number.

When the CPU 106 executes the process in S707 of FIG. 7 (i.e., after reaching a NO determination in S703 or a YES determination in S705), the CPU 106 stores identification data for the device selected in S707 in the RAM 108. Accordingly, when the CPU 106 has executed the process in S707, in the subsequent process of S711 or S712 the CPU 106 may be configured to use the device IP address that was stored in the RAM 108 in S707 rather than the IP address stored in the memory area A of the flash memory 109. In this case, the CPU 106 may execute the processes in S711 and S712 between steps S707 and S708. Alternatively, the processes in S711 and S712 may be performed between S708 and S709 or between S709 and S710. The same configuration may also be applied to the processes described in FIG. 10, FIG. 13, and FIG. 17B.

In S706 of FIG. 7, the CPU 106 in the first embodiment is configured to display in the display area 101 the model numbers of only those devices connected to the network that possess a color printing function, but the CPU 106 may instead be configured to display in the display area 101 the model numbers of only those devices possessing a color inkjet printing function. Similarly, in S806 of FIG. 10, the CPU 106 of the first embodiment is configured to display in the display area 101 the model numbers of only those devices connected to the network that possess a printing function, but the CPU 106 may be configured to display model numbers in the display area 101 for only those devices that possess a color printing function.

In the process of FIG. 7, the CPU 106 may be configured to select the device determined to be most suitable for printing photographs and to store identification data for this device as the photo print default device. In this case, the following process may be performed in place of steps S706 and S707. Specifically, the CPU 106 controls the wireless communication interface 105 to broadcast a packet over the network to which the data processor 100 is connected requesting devices to return their model numbers and information related to the functions they possess. In response, the requested data is returned from each device connected to the network. The CPU 106 controls the wireless communication interface 105 to receive the model number and functional information returned from each device and stores this model number and functional information in the RAM 108.

The CPU 106 selects one device connected to the data processor 100 via the network that is most suitable for printing photographs based on the information stored in the RAM 108. The process in S708 and subsequent steps may be configured identical to that described in the first embodiment. Some examples of conditions used to determine whether a device is suitable for photo printing are (1) the possession of a color inkjet printing function and (2) the ability to use photo-quality recording paper. Similarly, in the processes of FIG. 10 and FIG. 13, the data processor 100 may automatically select a device best-suited to printing Web pages and a device best-suited to scanning.

In addition, the conditions under which the CPU 106 stores a device as a default device are not limited to those described in FIG. 8-FIG. 9, FIG. 11-FIG. 12, and FIG. 14-FIG. 15. For example, it is possible to add such conditions as (1) a device can be stored as a Web print default device only when the device can perform color printing, and (2) a device can be stored as the scan default device only when the resolution of the scanning function meets or exceeds a threshold value.

Additionally, the data processor 100 may be configured to query the user on whether to record a device as the default device, in which case the device is recorded as a default device only upon receiving user authorization.

When a device can be stored as the Web print default device only when capable of performing color printing, the CPU 106 may perform a determination in place of that described in S1402 of FIG. 14 for determining whether the scan default device possesses a color printing function. In this case, the CPU 106 advances to S1403 when the scan default device possesses a color printing function and ends the process of FIG. 14 when the scan default device does not possess a color printing function.

Similarly, when a device can be stored as the scan default device only when the resolution of the scanning function meets or exceeds a threshold value, the CPU 106 may be configured to perform an additional step between S1102 and S1103 in FIG. 9 for determining whether the scanning resolution meets or exceeds the prescribed value. In this case, the CPU 106 advances to S1103 when the resolution is at least the prescribed value and ends the process of FIG. 9 when the resolution is less than the prescribed value. The same condition for scanning resolution may also be incorporated in the flowchart of FIG. 12. In this case, the CPU 106 acquires the resolution of a scanning function as functional information of the devices in S706 of FIG. 7 and in S806 of FIG. 10.

In the first embodiment, the IP address of a device that was not selected in S707 of FIG. 7 cannot be stored as the identification data for the Web print default device or the scan default device in FIG. 8 and FIG. 9. For example, if the ink jet MFP 200 shown in FIG. 4 was not selected in S707 of FIG. 7, the IP address of the ink jet MFP 200 is not stored in the memory area C of the flash memory 109 in FIG. 9. However, the process of FIG. 9 may be modified as shown in FIG. 18 so that the data processor 100 is able to store the IP address of devices not selected in S707 of FIG. 7 in the memory area C of the flash memory 109.

Figure 18:
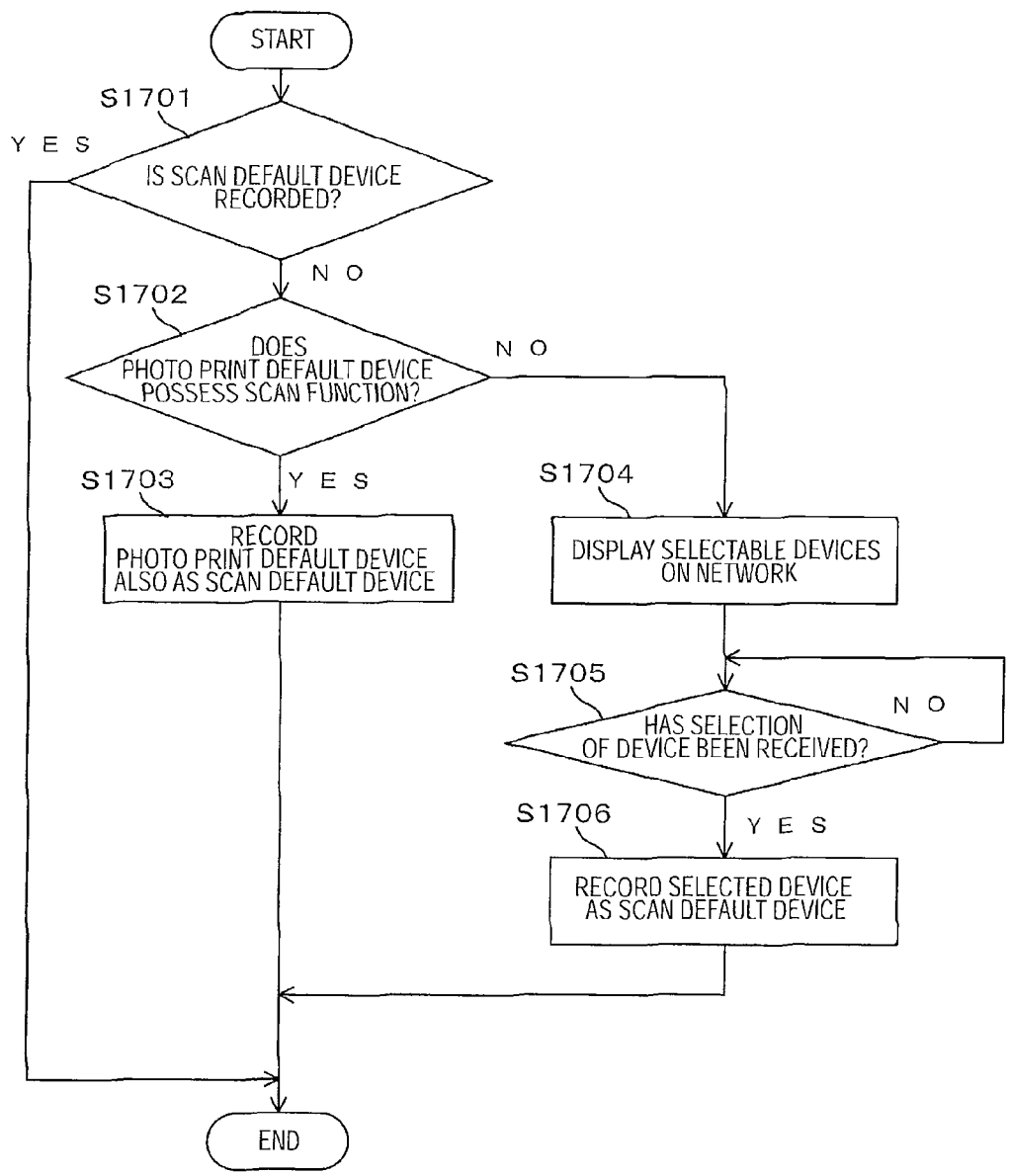
FIG. 18 is a modification of the process shown in FIG. 9 for storing identification data for a scan default device.

That is, as in S1101, in S1701 of FIG. 18 the CPU 106 determines whether identification data for a scan default device is currently stored in the flash memory 109. The CPU 106 ends the process in FIG. 18 when determining that identification data is stored for a scan default device (S1701: YES) and advances to S1702 when identification data has not been stored for a scan default device (S1701: NO).

In S1702 the CPU 106 determines whether the photo print default device is equipped with a scan function based on data that was stored in the RAM 108 in S706. If the device possesses a scan function (S1702: YES), in S1703 the CPU 106 stores identification data for the photo print default device in the flash memory 109 as identification data for the scan default device. In other words, the CPU 106 extracts the device IP address from the memory area A of the flash memory 109 and stores this address in the memory area C of the flash memory 109 in association with the device model number. However, if the photo print default device does not possess a scan function (S1702: NO), in S1704 the CPU 106 extracts the model numbers of devices connected to the network that have a scan function based on the data stored in the RAM 108 in S706. The CPU 106 displays a list of extracted model numbers in the display area 101.

In S1705 the CPU 106 determines according to the same method described in S707 whether the user has selected a device. The CPU 106 advances to S1706 upon determining that a device was selected (S1705: YES) and continues to repeat the determination in S1705 when determining that no selection has been made (S1705: NO).

In S1706 the CPU 106 stores the IP address of the device selected in S1705 in the memory area C of the flash memory 109 in correlation with the model number of the device according to the same method described in S708, and subsequently ends the process of FIG. 18.

Alternatively, in place of steps S1704-S1706 of FIG. 18, the CPU 106 may be configured to select a single device best-suited for scanning from among the devices connected to the network based on the data that was stored in the RAM 108 in S706. For example, the CPU 106 may automatically select the device supporting the highest scanning resolution. This configuration may also be applied to the processes described in FIG. 9, FIG. 12, and FIG. 13.

In addition to the photo print function and Web print function, the print-and-scan application may also include a document print function. In this case, the data processor 100 registers a document default device that possesses a document print function for printing document data, such as .pdf files and .doc files created with an application program.

The types of data and functions made available in the data processor 100 may be fewer or more numerous than those described in the first and second embodiments.

The CPU 106 may be configured to execute the processes in S701 and S702 of FIG. 7 and the processes in S801 and S802 of FIG. 10 according to other application programs or an operating system (OS) preinstalled on the data processor 100. With this configuration, in S702 the CPU 106 extracts location data for image data stored in an area of the RAM 108 referenced when executing a process according to the OS or other application program and stores this location data in an area of the RAM 108 used when executing the print-and-scan application. The process in S703 and subsequent steps are identical to that described in the first embodiment. Similarly, in S802 the CPU 106 extracts the URL stored in an area of the RAM 108 that is used when the CPU 106 executes a process according to the OS and stores this URL in an area of the RAM 108 referenced when executing the print-and-scan application. The process in S803 and subsequent steps is identical to that described in the first embodiment.

The data processor of the present invention may have a configuration for connecting to external memory, such as an SD card. Hence, instead of using flash memory, the data processor may store various data in the external memory.

When determining whether identification data is stored for a default device in S703 of FIG. 7, S1001 of FIG. 8, S1101 of FIG. 9, S803 of FIG. 10, S1201 of FIG. 11, S1301 of FIG. 12, S901 of FIG. 13, S1401 of FIG. 14, S1501 of FIG. 15, and S1602 and S1612 of FIG. 17B, the CPU 106 may determine whether identification data was stored or not stored based on whether the data bits of the memory area A, B, or C in the flash memory 109 are not all set to "0" or are all set to "0". Further, the CPU 106 may determine whether identification data is stored for the default device based on whether an invalid bit for invalidating stored identification data has been set. The invalid bit is stored in part of the memory area of the flash memory 109 for storing identification data (generally the first bit). Alternatively, a flag for invalidating identification data may be stored in place of the invalid bit in a separate memory area from the area of the flash memory 109 used for storing identification data, and the CPU 106 may determine whether identification data is stored based on this flag.

When the CPU 106 stores identification data for the photo print default device in S708, instead of storing the IP address of the device in the memory area A of the flash memory 109 in association with the device model number, the CPU 106 may be configured to perform the following process. That is, the CPU 106 may store data indicating that the device is a photo print default device and the IP address of the device in the flash memory 109 in association with the device model number. Consequently, in S710 the CPU 106 reads the IP address of the device from the memory area of the flash memory 109 in which the data indicating that the device is a photo print default device and the device IP address are stored in association with the device model number, sets the destination to this IP address, and controls the wireless communication interface 105 to transmit a print request to the photo print default device for printing the image data selected in S702. The method described above may also be applied to S1002 of FIG. 8, S1103 of FIG. 9, S808 of FIG. 10, S1205 of FIG. 11, S1303 of FIG. 12, S906 of FIG. 13, S1403 of FIG. 14, S1505 of FIG. 15, and S1607 and S1617 of FIG. 17B.

When the CPU 106 stores identification data of the photo print default device in the memory area B of the flash memory 109 as identification data for the Web print default device in S1002 of FIG. 8, the CPU 106 may store information giving directions to reference the data stored in the memory area A of the flash memory 109 rather than the IP address. This same format may be applied to S1103 of FIG. 9, S1205 of FIG. 11, S1303 of FIG. 12, S1403 of FIG. 14, and S1505 of FIG. 15.

The CPU 106 may be configured to store the URL or MAC address of a device in the memory area A, memory area B, or memory area C of the flash memory 109 in place of the IP address as identification data for the default device. When the CPU 106 is configured to store a MAC address in the memory area A, B, or C, the data processor 100 transmits a MAC frame instead of a packet that includes the MAC address of the device as the destination address and the MAC address of the data processor 100 as the source address. When the CPU 106 is configured to store a URL in the memory area A, B, or C, the CPU 106 may acquire the IP address associated with the URL and use this IP address to communicate with the device.

In S707 of FIG. 7, the user may be allowed to select a plurality of devices. In such a case, the processes in S707-S710 are implemented as follows. After a window is displayed in the display area 101 in S706, in S707 the CPU 106 determines whether the user has touched a prescribed number of regions (at least one region among a plurality of regions) in the display area 101 displaying the model numbers of devices. The CPU 106 determines that selections have been received for devices whose model numbers were displayed in touched regions when a prescribed number of regions (at least one region among a plurality of regions) displaying model numbers have been touched. The CPU 106 advances to S708 when determining that devices have been selected (S707: YES) and continues to repeat the determination in S707 when determining that selections have not all been received (S707: NO).

In S708 the CPU 106 stores the IP address for each of the prescribed number of devices (at least one device) selected in S707 in the memory area A of the flash memory 109 in correlation with the model number of the corresponding device. At this time, the CPU 106 may be configured to add the identification data for the selected devices to identification data already stored in the memory area A of the flash memory 109 rather than overwriting the existing identification data with the identification data of the newly selected devices. The CPU 106 may also set the invalid bit described above in all identification data for the devices (photo print default devices) that are stored in the memory area A of the flash memory 109. The CPU 106 also displays the Print Command window in the display area 101 in S708. Here, the CPU 106 displays in the Print Command window the model numbers of all devices selected in S707 (all photo print default devices).

In S709 the CPU 106 determines whether a print command was received. Specifically, the CPU 106 determines whether the user touched the region in the display area 101 in which the Print icon 701 for issuing a print command is displayed. If the user touched the region in which the Print icon 701 is displayed, the CPU 106 determines that a print command was inputted. Upon determining that a print command was inputted, the CPU 106 further determines whether the user touched a region in the Print Command window where one of the plurality of device model numbers is displayed. If the CPU 106 determines that a region corresponding to a displayed model number was touched (S709: YES), the CPU 106 determines that the device having the model number displayed in the touched region was selected and clears the invalid bit set in the identification data for the selected device.

In S710 the CPU 106 controls the wireless communication interface 105 to transmit a print request to the device selected in S709 for printing image data. However, if the CPU 106 determines that a print command was not inputted or that the display region for a model number was not touched (S709: NO), the CPU 106 returns to S705. The remainder of this process is identical to that described in the first embodiment.

Alternatively, in this modification, the following process may be implemented in S709 and S710. When the user touches a region in which the Print icon 701 is displayed, the CPU 106 selects the best-suited device for photo printing from the plurality of displayed devices (photo print default devices) and clears the invalid bit set in the identification data for the selected device. In S710 the CPU 106 controls the wireless communication interface 105 to transmit a print request for printing image data to the photo print default device whose invalid bit was cleared in S709. These methods may also be applied to S807-S810 of FIG. 10; S905-S908 of FIG. 13; S1606-S1609 and S1616-S1619 of FIG. 17B.

When the wireless communication interface 105 fails to transmit the print request in S710 of FIG. 7, the CPU 106 may perform the following procedure. First, the CPU 106 determines whether transmission of the print request failed. When a failure has occurred, the CPU 106 displays an error message in the display area 101 together with an "OK" icon. The CPU 106 returns to S704 after the user has touched the region of the display area 101 in which the OK icon is displayed. In this way, the user may indicate a desire to reselect the photo print default device in S705 and can select a desired device in S706 from the available devices displayed in the display area 101. This same procedure may also be applied to the processes in FIG. 10, FIG. 13, and FIG. 17B.

While the invention has been described in detail with reference to the embodiments and variations thereof, it would be apparent to those skilled in the art that various changes and modifications may be made therein without departing from the spirit of the invention.

For example, in the second embodiment, the CPU 106 interprets in S1601 location information for the data to be processed, to determine the type of the data to be processed. However, instead of interpreting location information, the CPU 106 may interpret the data to be processed, per se, to determine the type of the data to be processed. For example, the CPU 106 may interpret the header region in the data to be processed, to determine the type of the data to be processed.

What is claimed is:

1. A data-processing method for being executed by a data-processing apparatus having a storage unit, the method comprising:

specifying a type of data that corresponds to a process desired to be executed;

reading, from the storage unit, device identification information that is stored in the storage unit in correspondence with the specified type of data; and communicating with a device that is identified by the device identification information so as to cause the device to execute the desired process, wherein the storage unit stores data type specifying information specifying correspondence between a plurality of different data types and a plurality of different types of location information indicative of location where the corresponding type of data is stored, and wherein the specifying includes:

acquiring location information indicative of location of data to be processed; and determining a type of the data to be processed by referring to the data type specifying information based on the acquired location information.

2. A data-processing method as claimed in claim 1, further comprising:

judging whether the storage unit stores the device identification information in correspondence with the specified type of data;

acquiring, if the storage unit stores no device identification information in correspondence with the specified type of data, device identification information for at least one device that can process data of the specified type; and storing, in the storage unit, device identification information for one of the at least one device in correspondence with the specified type of data.

3. A data-processing method as claimed in claim 2, further comprising:

judging whether the storage unit stores device identification information in correspondence with another type of data that is other than the specified type of data, storing the device identification information for the specified type of data in correspondence with the other type of data if the storage unit stores no device identification information in correspondence with the other type of data; and failing to store the device identification information for the specified type of data in correspondence with the other type of data if the storage unit stores device identification information in correspondence with the other type of data.

4. A data-processing method as claimed in claim 1, wherein the data type specifying information specifies correspondence between each data type and a string of characters contained in a type of location information indicative of location where each data type is stored, the determining judges which character string is contained in the acquired location information, thereby specifying the type of the data to be processed.

5. A data-processing method as claimed in claim 4, wherein the plurality of different data types include Web page data and image data, and the data type specifying information specifies a character string indicative of a scheme that specifies a URL as a character string corresponding to Web page data, and the data type specifying information further specifies a character string indicating an absolute path including an extension of image data as a character string corresponding to image data.

6. A data-processing apparatus, comprising:
- a storage unit that is configured to store information;
- a specifying unit that specifies a type of data that corresponds to a process desired to be executed;
- a reading unit that reads, from the storage unit, device identification information that is stored in the storage unit in correspondence with the specified type of data; and
- a communicating unit that communicates with a device that is identified by the device identification information so as to cause the device to execute the desired process,
- wherein the storage unit stores data type specifying information specifying correspondence between a plurality of different data types and a plurality of different types of location information indicative of location where the corresponding type of data is stored, and
- wherein the specifying unit includes:
  - a location acquiring unit that acquires location information indicative of location of data to be processed; and
  - a determining unit that determines a type of the data to be processed by referring to the data type specifying information based on the acquired location information.

7. A data-processing apparatus as claimed in claim 6, further comprising:
- a judging unit that judges whether the storage unit stores the device identification information in correspondence with the specified type of data;
- an acquiring unit that acquires, if the storage unit stores no device identification information in correspondence with the specified type of data, device identification information for at least one device that can process data of the specified type; and
- a storage controlling unit that stores device identification information for one of the at least one device in the storage unit in correspondence with the specified type of data.

8. A data-processing apparatus as claimed in claim 7, wherein the judging unit further judges whether the storage unit stores device identification information in correspondence with another type of data that is other than the specified type of data, and
wherein the storage controlling unit stores the device identification information for the specified type of data in correspondence with the other type of data if the storage unit stores no device identification information in correspondence with the other type of data, the storage controlling unit failing to store the device identification information for the specified type of data in correspondence with the other type of data if the storage unit stores device identification information in correspondence with the other type of data.

9. A data-processing apparatus as claimed in claim 6, wherein
the data type specifying information specifies correspondence between each data type and a string of characters contained in a type of location information indicative of location where each data type is stored,
the determining unit judges which character string is contained in the acquired location information, thereby specifying the type of the data to be processed.

10. A data-processing apparatus as claimed in claim 9, wherein
the plurality of different data types include Web page data and image data, and
the data type specifying information specifies a character string indicative of a scheme that specifies a URL as a character string corresponding to Web page data, and
the data type specifying information further specifies a character string indicating an absolute path including an extension of image data as a character string corresponding to image data.

11. A non-transitory storage medium storing a set of program instructions executable on a data-processing apparatus having a storage unit, the instructions comprising:
- specifying a type of data that corresponds to a process desired to be executed;
- reading, from the storage unit, device identification information that is stored in the storage unit in correspondence with the specified type of data; and
- communicating with a device that is identified by the device identification information so as to cause the device to execute the desired process,
- wherein the storage unit stores data type specifying information specifying correspondence between a plurality of different data types and a plurality of different types of location information indicative of location where the corresponding type of data is stored, and
- wherein the specifying includes:
  - acquiring location information indicative of location of data to be processed, the location information being read to the data-processing apparatus according to execution of another set of program instructions that is other than the set of program instructions; and
  - determining a type of the data to be processed by referring to the data type specifying information based on the acquired location information.

12. A non-transitory storage medium as claimed in claim 11, wherein
the data type specifying information specifies correspondence between each data type and a string of characters contained in a type of location information indicative of location where each data type is stored,
the determining judges which character string is contained in the acquired location information, thereby specifying the type of the data to be processed.

13. A non-transitory storage medium as claimed in claim 12, wherein
the plurality of different data types include Web page data and image data, and
the data type specifying information specifies a character string indicative of a scheme that specifies a URL as a character string corresponding to Web page data, and
the data type specifying information further specifies a character string indicating an absolute path including an extension of image data as a character string corresponding to image data.

* * * * *